US011652520B2

(12) United States Patent
Chen et al.

(10) Patent No.: US 11,652,520 B2
(45) Date of Patent: May 16, 2023

(54) BATCH-BASED FEEDBACK IN NEW RADIO

(71) Applicant: QUALCOMM Incorporated, San Diego, CA (US)

(72) Inventors: Wanshi Chen, San Diego, CA (US); Prashanth Haridas Hande, San Diego, CA (US); Jay Kumar Sundararajan, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/928,201

(22) Filed: Jul. 14, 2020

(65) Prior Publication Data

US 2021/0036750 A1    Feb. 4, 2021

Related U.S. Application Data

(60) Provisional application No. 62/881,666, filed on Aug. 1, 2019.

(51) Int. Cl.
*H04B 7/0456* (2017.01)
*H04B 7/0417* (2017.01)
(Continued)

(52) U.S. Cl.
CPC ......... *H04B 7/0482* (2013.01); *H04B 7/0417* (2013.01); *H04L 1/1861* (2013.01); *H04L 5/0055* (2013.01); *H04W 72/23* (2023.01)

(58) Field of Classification Search
CPC ............... H04B 7/0417; H04B 7/0482; H04L 1/1861; H04L 5/0055; H04L 1/1864
See application file for complete search history.

(56) References Cited

U.S. PATENT DOCUMENTS

2006/0221836 A1* 10/2006 Wang ................... H04N 21/643
370/254
2020/0374045 A1* 11/2020 Yin ....................... H04B 7/0456
2021/0218513 A1* 7/2021 Ma ..................... H04W 72/0446

OTHER PUBLICATIONS

Chaynika T., et al., "QoE-Aware Cross-Layer Adaptation for Delay-Constrained Video Transmission Over Wireless Channels", 2019 IEEE Wireless Communications and Networking Conference (WCNC), IEEE, Apr. 15, 2019 (Apr. 15, 2019), pp. 1-6, XP033651911, DOI: 10.1109/WCNC.2019.8885439 [retrieved on Oct. 28, 2019] abstract p. 2, Fig. 2(a) p. 5, section V, Conclusion.

(Continued)

*Primary Examiner* — Ayaz R Sheikh
*Assistant Examiner* — Debebe A Asefa
(74) *Attorney, Agent, or Firm* — Holland & Hart LLP

(57) ABSTRACT

Methods, systems, and devices for wireless communications are described. According to one or more aspects, a device, such as a user equipment (UE), may receive downlink control information, and may determine assignment information for processing batch-based feedback based on the downlink control information. The UE may determine the batch-based feedback for a batch of downlink transmissions (for example, transmissions associated with packets of information) that are configured to be processed together by the UE. The UE may receive a downlink transmission from the base station, and may construct a codebook based on assignment information and the downlink transmission. In some examples, the UE may determine acknowledgment feedback for the downlink transmission based on the codebook. The UE may transmit the acknowledgment feedback to the base station.

30 Claims, 16 Drawing Sheets

(51) Int. Cl.
  *H04L 1/1829*  (2023.01)
  *H04L 5/00*    (2006.01)
  *H04W 72/23*   (2023.01)

(56) References Cited

OTHER PUBLICATIONS

International Search Report and Written Opinion—PCT/US2020/042068—ISA/EPO—dated Oct. 9, 2020.
Mediatek Inc: "Evaluation and Enhancements of NR PUCCH", 3GPP Draft, 3GPP TSG RAN WG1 Meeting #95, R1-1812375 Evaluation and Enhancements of NR PUCCH, 3RD Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018), XP051554284, 10 pages, Retrieved from the Internet: URL:http://www.3gpp.org/ftp/Meetings%5F3GPP%5FSYNC/RAN1/Docs/R1%2D1812375%2Ezip [retrieved on Nov. 11, 2018]section 3.3.

\* cited by examiner

BATCH-BASED FEEDBACK IN NEW RADIO

CROSS REFERENCE

The present application for Patent claims the benefit of U.S. Provisional Patent Application No. 62/881,666 by Chen et al., entitled "BATCH-BASED FEEDBACK IN NEW RADIO," filed Aug. 1, 2019, assigned to the assignee hereof, and expressly incorporated by reference in its entirety herein.

BACKGROUND

The following relates generally to wireless communications, and more specifically to batch-based feedback in new radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Wireless multiple-access communications systems may include a number of base stations or network access nodes, each simultaneously supporting communication for multiple communication devices, which may be otherwise known as user equipment (UE). Some wireless communications systems (for example, NR systems), may support high throughput and low latency communications. Some techniques for supporting high throughput and low latency communications, however, may be deficient in some implementations.

SUMMARY

The described techniques relate to improved methods, systems, devices, and apparatuses that support batch-based feedback in new radio (NR). Generally, the described techniques provide for enhancing reliability in communication links in NR systems. According to one or more aspects of the present disclosure, batch-based feedback may be provided in which a user equipment (UE) may transmit acknowledgment feedback (e.g., hybrid automatic repeat request (HARQ) feedback) to a base station for a batch of downlink transmissions. In some examples, the batch of downlink transmissions may include downlink transmissions (e.g., downlink transmissions including packets) that may be configured to be processed together (e.g., as a unit, as a batch, as a group) by an application associated with the UE. In some cases, a UE (e.g., a first device) may determine assignment information (such as a counter or a total or both) associated with at least some downlink transmissions if not each downlink transmission of the batch of downlink transmissions that are configured to be processed together. In some cases, the UE may receive a downlink transmission from a base station (e.g., a second device). Upon receiving at least one downlink transmission, the UE may construct a codebook based on the determined assignment information (e.g., the counter value and the total value). The UE may then transmit a batch-based acknowledgment feedback based on the codebook.

A method of wireless communication at a first device is described. The method may include determining assignment information for processing batch-based feedback for a batch of downlink transmissions that are configured to be processed together by the first device, receiving, from a second device, a downlink transmission from the batch of downlink transmissions, constructing, based on the assignment information and the downlink transmission, a codebook associated with the processing batch-based feedback, determining, based on the codebook, acknowledgment feedback for the downlink transmission, and transmitting, to the second device, the acknowledgment feedback.

An apparatus for wireless communication at a first device is described. The apparatus may include a processor, memory coupled with the processor, and instructions stored in the memory. The instructions may be executable by the processor to cause the apparatus to determine assignment information for processing batch-based feedback for a batch of downlink transmissions that are configured to be processed together by the first device, receive, from a second device, a downlink transmission from the batch of downlink transmissions, construct, based on the assignment information and the downlink transmission, a codebook associated with the processing batch-based feedback, determine, based on the codebook, acknowledgment feedback for the downlink transmission, and transmit, to the second device, the acknowledgment feedback.

Another apparatus for wireless communication at a first device is described. The apparatus may include means for determining assignment information for processing batch-based feedback for a batch of downlink transmissions that are configured to be processed together by the first device, receiving, from a second device, a downlink transmission from the batch of downlink transmissions, constructing, based on the assignment information and the downlink transmission, a codebook associated with the processing batch-based feedback, determining, based on the codebook, acknowledgment feedback for the downlink transmission, and transmitting, to the second device, the acknowledgment feedback.

A non-transitory computer-readable medium storing code for wireless communication at a first device is described. The code may include instructions executable by a processor to determine assignment information for processing batch-based feedback for a batch of downlink transmissions that are configured to be processed together by the first device, receive, from a second device, a downlink transmission from the batch of downlink transmissions, construct, based on the assignment information and the downlink transmission, a codebook associated with the processing batch-based feedback, determine, based on the codebook, acknowledgment feedback for the downlink transmission, and transmit, to the second device, the acknowledgment feedback.

In some examples of the method, apparatuses, and non-transitory computer-readable medium described herein, the assignment information for the processing batch-based feedback includes a batch assignment index counter, a total batch assignment index, or both.

In some examples of the method, apparatuses, and non-transitory computer-readable medium described herein, determining the assignment information may include operations, features, means, or instructions for receiving, from the second device, a downlink control information, and determining the batch assignment index counter based on receiving the downlink control information, where constructing the codebook may be based on determining the batch assignment index counter.

Some examples of the method, apparatuses, and non-transitory computer-readable medium described herein may further include operations, features, means, or instructions for identifying a bit width associated with the batch assignment index counter based on receiving the downlink control information, and determining a mapping between an index associated with the downlink transmission and a value of the bit width associated with the batch assignment index counter, where constructing the codebook may be based on determining the mapping.

In some examples of the method, apparatuses, and non-transitory computer-readable medium described herein, determining the mapping further may include operations, features, means, or instructions for determining that a first index with associated with a first downlink transmission and a second index with associated with a second downlink transmission may be mapped to the same value of the bit width, where constructing the codebook may be based on determining the mapping.

In some examples of the method, apparatuses, and non-transitory computer-readable medium described herein, the bit width associated with the batch assignment index counter may be based on a format associated with the downlink control information. In some examples of the method, apparatuses, and non-transitory computer-readable medium described herein, the format associated with the downlink control information includes a fallback downlink control information. In some examples of the method, apparatuses, and non-transitory computer-readable medium described herein, the fallback downlink control information includes a single bit.

In some examples of the method, apparatuses, and non-transitory computer-readable medium described herein, the format associated with the downlink control information includes a non-fallback downlink control information. In some examples of the method, apparatuses, and non-transitory computer-readable medium described herein, the non-fallback downlink control information includes two bits.

In some examples of the method, apparatuses, and non-transitory computer-readable medium described herein, determining the assignment information further may include operations, features, means, or instructions for receiving, from the second device, a downlink control information indicating a total number of downlink transmissions included in the batch of downlink transmissions, and identifying the total batch assignment index based on receiving the downlink control information, where constructing the codebook may be based on identifying the total batch assignment index.

Some examples of the method, apparatuses, and non-transitory computer-readable medium described herein may further include operations, features, means, or instructions for identifying a bit width associated with the total batch assignment index based on receiving the downlink control information, where constructing the codebook may be based on identifying the bit width associated with the total batch assignment index.

In some examples of the method, apparatuses, and non-transitory computer-readable medium described herein, the bit width associated with the total batch assignment index may be the same as a number of bits associated with uniquely identifying each downlink transmission of the total number of downlink transmissions.

In some examples of the method, apparatuses, and non-transitory computer-readable medium described herein, the bit width associated with the total batch assignment index may be less than a number of bits associated with uniquely identifying each downlink transmission of the total number of downlink transmissions.

Some examples of the method, apparatuses, and non-transitory computer-readable medium described herein may further include operations, features, means, or instructions for receiving a second downlink transmission from the second device, and determining, based on the assignment information, that the second downlink transmission may be not included in the batch of downlink transmissions that may be configured to be processed together by the first device, where constructing the codebook associated with the processing batch-based feedback may be based on the determining.

In some examples of the method, apparatuses, and non-transitory computer-readable medium described herein, the assignment information includes an entry in a batch assignment index counter indicating that the second downlink transmission may be not included in the batch of downlink transmissions.

Some examples of the method, apparatuses, and non-transitory computer-readable medium described herein may further include operations, features, means, or instructions for determining second assignment information for the processing batch-based feedback for a second batch of downlink transmissions, receiving a second downlink transmission from the second device, and determining, based on the second assignment information, that the second downlink transmission may be included in the second batch of downlink transmissions that may be configured to be processed together by the first device, where constructing the codebook associated with the processing batch-based feedback may be based on determining that the second downlink transmission may be included in the second batch of downlink transmissions.

Some examples of the method, apparatuses, and non-transitory computer-readable medium described herein may further include operations, features, means, or instructions for determining that the first device may be configured for a processing batch-based transmission based on determining the assignment information for the processing batch-based feedback, where constructing the codebook associated with the processing batch-based feedback may be based on the determining.

In some examples of the method, apparatuses, and non-transitory computer-readable medium described herein, the assignment information for the processing batch-based feedback may be configured for each first device associated with the second device, or each component carrier associated with the first device, or a combination thereof.

Some examples of the method, apparatuses, and non-transitory computer-readable medium described herein may further include operations, features, means, or instructions for determining second assignment information for a non-batch-based feedback for a second batch of downlink transmissions, where the non-batch-based feedback includes a code block group-based feedback, a non-group based feedback, or a combination thereof, receiving, from the second device, a second downlink transmission from the second batch of downlink transmissions, and constructing, based on the second assignment information, a second codebook associated with the non-batch-based feedback. In some examples of the method, apparatuses, and non-transitory computer-readable medium described herein, the second assignment information for the non-batch-based feedback includes the assignment information for the processing batch-based feedback.

Some examples of the method, apparatuses, and non-transitory computer-readable medium described herein may further include operations, features, means, or instructions for determining that a code block group may be enabled for a first component carrier associated with the batch of downlink transmissions and the code block group may be disabled for a second component carrier associated with the batch of downlink transmissions, where constructing the codebook associated with the processing batch-based feedback may be based on determining that the code block group may be enabled for the first component carrier associated with the batch of downlink transmissions and the code block group may be disabled for the second component carrier associated with the batch of downlink transmissions.

Some examples of the method, apparatuses, and non-transitory computer-readable medium described herein may further include operations, features, means, or instructions for receiving, from the second device, a second downlink transmission from the batch of downlink transmissions, and determining a second acknowledgment feedback for the second downlink transmission, where transmitting the acknowledgment feedback further includes transmitting the second acknowledgment feedback.

Some examples of the method, apparatuses, and non-transitory computer-readable medium described herein may further include operations, features, means, or instructions for receiving, from the second device, a second downlink transmission from the batch of downlink transmissions, and transmitting a negative acknowledgment feedback indicating a negative acknowledgment feedback for at least one downlink transmission of the batch of downlink transmissions.

Some examples of the method, apparatuses, and non-transitory computer-readable medium described herein may further include operations, features, means, or instructions for receiving, from the second device, a downlink control information, determining a batch index based on receiving the downlink control information, and determining, based on the batch index, second assignment information for the processing batch-based feedback for a second batch of downlink transmissions, where the batch of downlink transmissions and the second batch of downlink transmissions may be at least partially overlapped in time.

In some examples of the method, apparatuses, and non-transitory computer-readable medium described herein, the batch index may be included in an information field in the downlink control information. In some examples of the method, apparatuses, and non-transitory computer-readable medium described herein, determining the batch index further may include operations, features, means, or instructions for determining the batch index based on two or more information fields in the downlink control information. In some examples of the method, apparatuses, and non-transitory computer-readable medium described herein, the batch index includes an explicit batch index indicating the batch of downlink transmissions and the second batch of downlink transmissions.

A method of wireless communication at a second device is described. The method may include determining, assignment information for processing batch-based feedback for a batch of downlink transmissions that are configured to be processed together by a first device, transmitting, to the first device, the assignment information and a downlink transmission from the batch of downlink transmissions, and receiving, from the first device, an acknowledgment feedback for the transmitted downlink transmission, where the acknowledgment feedback is based on a codebook associated with the assignment information for the processing batch-based feedback.

An apparatus for wireless communication at a second device is described. The apparatus may include a processor, memory coupled with the processor, and instructions stored in the memory. The instructions may be executable by the processor to cause the apparatus to determine, assignment information for processing batch-based feedback for a batch of downlink transmissions that are configured to be processed together by a first device, transmit, to the first device, the assignment information and a downlink transmission from the batch of downlink transmissions, and receive, from the first device, an acknowledgment feedback for the transmitted downlink transmission, where the acknowledgment feedback is based on a codebook associated with the assignment information for the processing batch-based feedback.

Another apparatus for wireless communication at a second device is described. The apparatus may include means for determining, assignment information for processing batch-based feedback for a batch of downlink transmissions that are configured to be processed together by a first device, transmitting, to the first device, the assignment information and a downlink transmission from the batch of downlink transmissions, and receiving, from the first device, an acknowledgment feedback for the transmitted downlink transmission, where the acknowledgment feedback is based on a codebook associated with the assignment information for the processing batch-based feedback.

A non-transitory computer-readable medium storing code for wireless communication at a second device is described. The code may include instructions executable by a processor to determine, assignment information for processing batch-based feedback for a batch of downlink transmissions that are configured to be processed together by a first device, transmit, to the first device, the assignment information and a downlink transmission from the batch of downlink transmissions, and receive, from the first device, an acknowledgment feedback for the transmitted downlink transmission, where the acknowledgment feedback is based on a codebook associated with the assignment information for the processing batch-based feedback.

In some examples of the method, apparatuses, and non-transitory computer-readable medium described herein, the assignment information for the processing batch-based feedback includes a batch assignment index counter, a total batch assignment index, or both. Some examples of the method, apparatuses, and non-transitory computer-readable medium described herein may further include operations, features, means, or instructions for transmitting, to the first device, a downlink control information, where the batch assignment index counter may be included in the downlink control information, and where the codebook may be based on the batch assignment index counter.

Some examples of the method, apparatuses, and non-transitory computer-readable medium described herein may further include operations, features, means, or instructions for identifying a bit width associated with the batch assignment index counter based on receiving the downlink control information, and determining a mapping between an index associated with the downlink transmission and a value of the bit width associated with the batch assignment index counter, where the codebook may be based on the mapping.

In some examples of the method, apparatuses, and non-transitory computer-readable medium described herein, determining the mapping further may include operations, features, means, or instructions for determining that a first index with associated with a first downlink transmission and a second index with associated with a second downlink transmission may be mapped to the same value of the bit width, where the codebook may be based on the determining.

In some examples of the method, apparatuses, and non-transitory computer-readable medium described herein, the bit width associated with the batch assignment index counter may be based on a format associated with the downlink control information. In some examples of the method, apparatuses, and non-transitory computer-readable medium described herein, the format associated with the downlink control information includes a fallback downlink control information.

In some examples of the method, apparatuses, and non-transitory computer-readable medium described herein, the fallback downlink control information includes a single bit. In some examples of the method, apparatuses, and non-transitory computer-readable medium described herein, the format associated with the downlink control information includes a non-fallback downlink control information. In some examples of the method, apparatuses, and non-transitory computer-readable medium described herein, the non-fallback downlink control information includes two bits.

Some examples of the method, apparatuses, and non-transitory computer-readable medium described herein may further include operations, features, means, or instructions for transmitting, to the first device, a downlink control information indicating a total number of downlink transmissions included in the batch of downlink transmissions, where the total batch assignment index may be included in the downlink control information, and where the codebook may be based on identifying the total batch assignment index.

Some examples of the method, apparatuses, and non-transitory computer-readable medium described herein may further include operations, features, means, or instructions for identifying a bit width associated with the total batch assignment index based on transmitting the downlink control information, where the codebook may be based on the bit width associated with the total batch assignment index.

In some examples of the method, apparatuses, and non-transitory computer-readable medium described herein, the bit width associated with the total batch assignment index may be the same as a number of bits associated with uniquely identifying each downlink transmission of the total number of downlink transmissions. In some examples of the method, apparatuses, and non-transitory computer-readable medium described herein, the bit width associated with the total batch assignment index may be less than a number of bits associated with uniquely identifying each downlink transmission of the total number of downlink transmissions.

Some examples of the method, apparatuses, and non-transitory computer-readable medium described herein may further include operations, features, means, or instructions for transmitting, to the first device, a second downlink transmission, where the second downlink transmission may be not included in the batch of downlink transmissions that may be configured to be processed together by the first device. In some examples of the method, apparatuses, and non-transitory computer-readable medium described herein, the assignment information includes an entry in a batch assignment index counter indicating that the second downlink transmission may be not included in the batch of downlink transmissions.

Some examples of the method, apparatuses, and non-transitory computer-readable medium described herein may further include operations, features, means, or instructions for determining second assignment information for the processing batch-based feedback for a second batch of downlink transmissions, and transmitting, to the first device, the second assignment information and the second batch of downlink transmissions. Some examples of the method, apparatuses, and non-transitory computer-readable medium described herein may further include operations, features, means, or instructions for determining that the first device may be configured for a processing batch-based transmission based on determining the assignment information for the processing batch-based feedback, where transmitting the assignment information may be based on the determining.

Some examples of the method, apparatuses, and non-transitory computer-readable medium described herein may further include operations, features, means, or instructions for configuring the assignment information for the processing batch-based feedback for each first device associated with the second device, or each component carrier associated with the first device, or a combination thereof. Some examples of the method, apparatuses, and non-transitory computer-readable medium described herein may further include operations, features, means, or instructions for determining a batch index associated with one or more downlink transmissions, and transmitting, to the first device, a downlink control information indicating the batch index, the batch index including second assignment information for the processing batch-based feedback for a second batch of downlink transmissions, where the batch of downlink transmissions and the second batch of downlink transmissions may be at least partially overlapped in time.

In some examples of the method, apparatuses, and non-transitory computer-readable medium described herein, the batch index may be included in an information field in the downlink control information. In some examples of the method, apparatuses, and non-transitory computer-readable medium described herein, the batch index includes an explicit batch index indicating the batch of downlink transmissions and the second batch of downlink transmissions. Some examples of the method, apparatuses, and non-transitory computer-readable medium described herein may further include operations, features, means, or instructions for determining that the batch of downlink transmissions and a second batch of downlink transmissions may be interleaved in time, and refraining from transmitting the second batch of downlink transmissions based on the determining.

DETAILED DESCRIPTION

A user equipment (UE) in a wireless communications system, such as a New Radio (NR) system or a Long Term Evolution (LTE) system, may support applications associated with high throughput and low latency. The described aspects of the disclosure relate to improved methods, systems, devices, or apparatuses that facilitate batch-based feedback for transmissions or retransmissions, such as batch-based hybrid automatic repeat request (HARQ) acknowledgment/negative-acknowledgment (ACK/NACK) feedback. In some examples, the techniques described herein enable use of assignment information for providing batch-based acknowledgment for one or more batches of downlink transmissions. In some implementations, a batch of downlink transmissions may include downlink transmissions that are configured to be processed together by the UE. According to one or more aspects of the present disclosure, a wireless communications system may be configured to group data packets as a batch, such as a batch associated with downlink transmissions. In one example, the wireless communications system may group the data packets based on a deadline associated with each data packet of the group of data packets. In some cases, a UE (e.g., first device) in the wireless communications system may be configured to receive a downlink control information from a base station (e.g., second device). The base station may indicate assignment information in the downlink control information. For example, the assignment information for the processing batch-based feedback may include a batch assignment index counter, a total batch assignment index, or both. The UE, upon receiving the downlink control information, may determine the assignment information for processing batch-based feedback for a batch of downlink transmissions.

In some cases, the UE may receive a downlink transmission from the batch of downlink transmissions (e.g., a packet from the identified group). The UE may construct a codebook based on the batch assignment index counter, or the total batch assignment index, or both. In some implementations, the codebook may be associated with the processing batch-based feedback. The UE may determine an acknowledgment feedback for the downlink transmission based on the codebook, and transmit the acknowledgement feedback to the base station.

Aspects of the disclosure are initially described in the context of a wireless communications system. Aspects of the disclosure are further illustrated by and described with reference to apparatus diagrams, system diagrams, and flowcharts that relate to batch-based feedback in NR.

Figure 1:
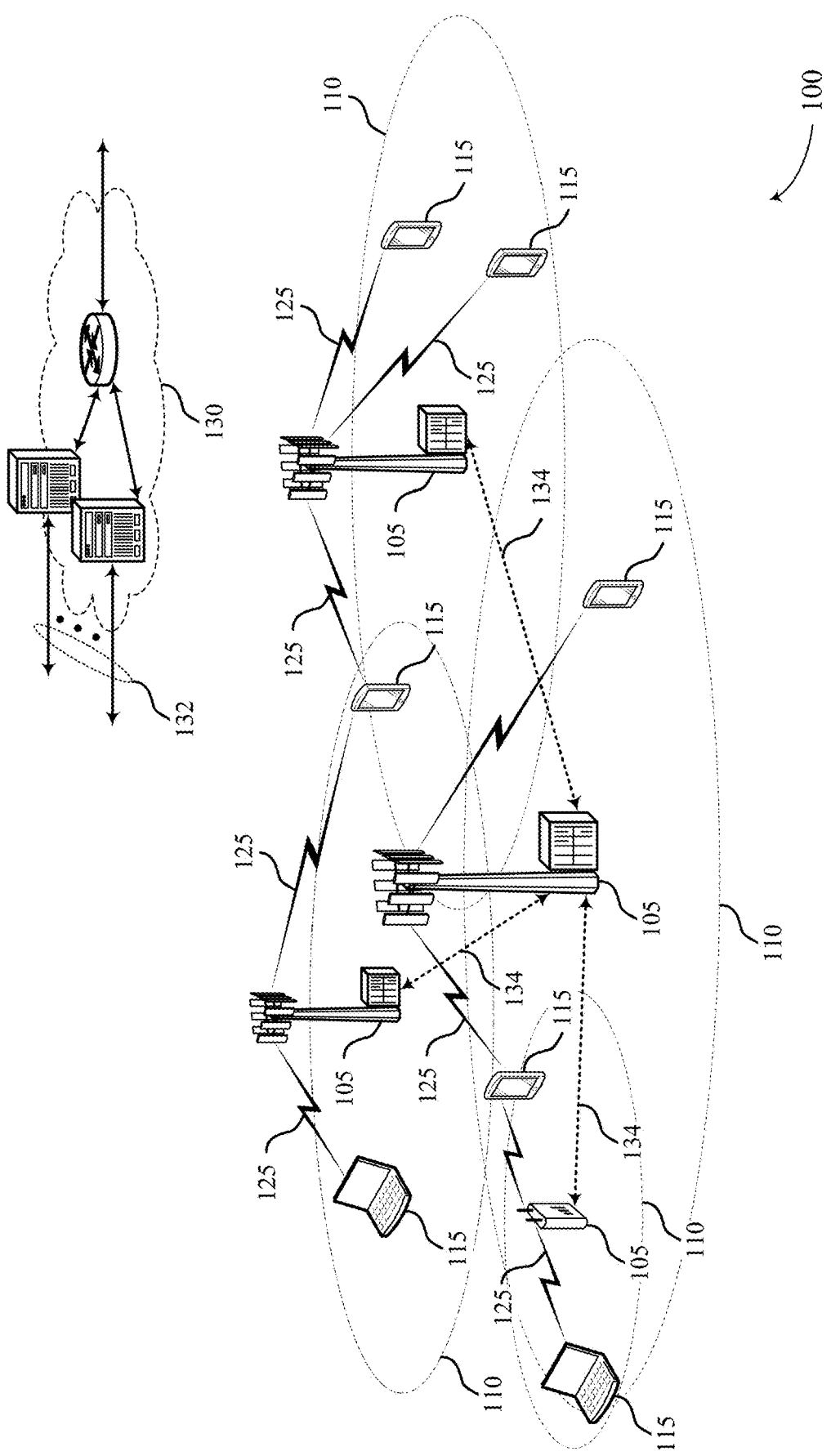
FIG. 1 illustrates an example of a wireless communications system that supports batch-based feedback in new radio (NR) in accordance with aspects of the present disclosure.

FIG. 1 illustrates an example of a wireless communications system 100 that supports batch-based feedback in NR in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Existing wireless communications system may receive data packets as a stream of bits, and may assign the data packets to transport blocks based on the received stream of bits. For some high throughput and low latency applications, it may be beneficial to group one or more transmitted packets as a batch. As one example, packets in a video frame of an application may be included in a batch (or a file), in which each batch is associated with a separate video frame. Additionally, it may be beneficial to acknowledge receipt of packets included in a batch (such as a video frame). Existing methods for acknowledgement may however be deficient.

To overcome the limitations of the existing wireless communications system, according to one or more aspects of the present disclosure, the wireless communications system 100 may be configured to group data packets of the same video frame as a batch. Additionally or alternatively, a UE 115 (e.g., first device) in the wireless communications system 100 may be configured to receive a downlink control information from a base station 105 (e.g., second device). In one example, the base station 105 may indicate assignment information in the downlink control information. In some cases, the UE 115 may determine assignment information for processing batch-based feedback for a batch of downlink transmissions that are configured to be processed together by the UE 115. In some cases, the assignment information for the processing batch-based feedback may include a batch assignment index counter, a total batch assignment index, or both. The UE 115 may then receive a downlink transmission from the batch of downlink transmissions (e.g., a packet from a group of packets included in a file). According to one or more aspects, the UE 115 may utilize the batch assignment index counter, or the total batch assignment index, or both, to construct a codebook associated with the processing batch-based feedback. The UE 115 may determine an acknowledgment feedback for the downlink transmission. In some cases, the acknowledgement feedback may be based on the codebook. Upon determining the acknowledgement feedback, the UE 115 may transmit the acknowledgement feedback to the base station 105.

Figure 2:
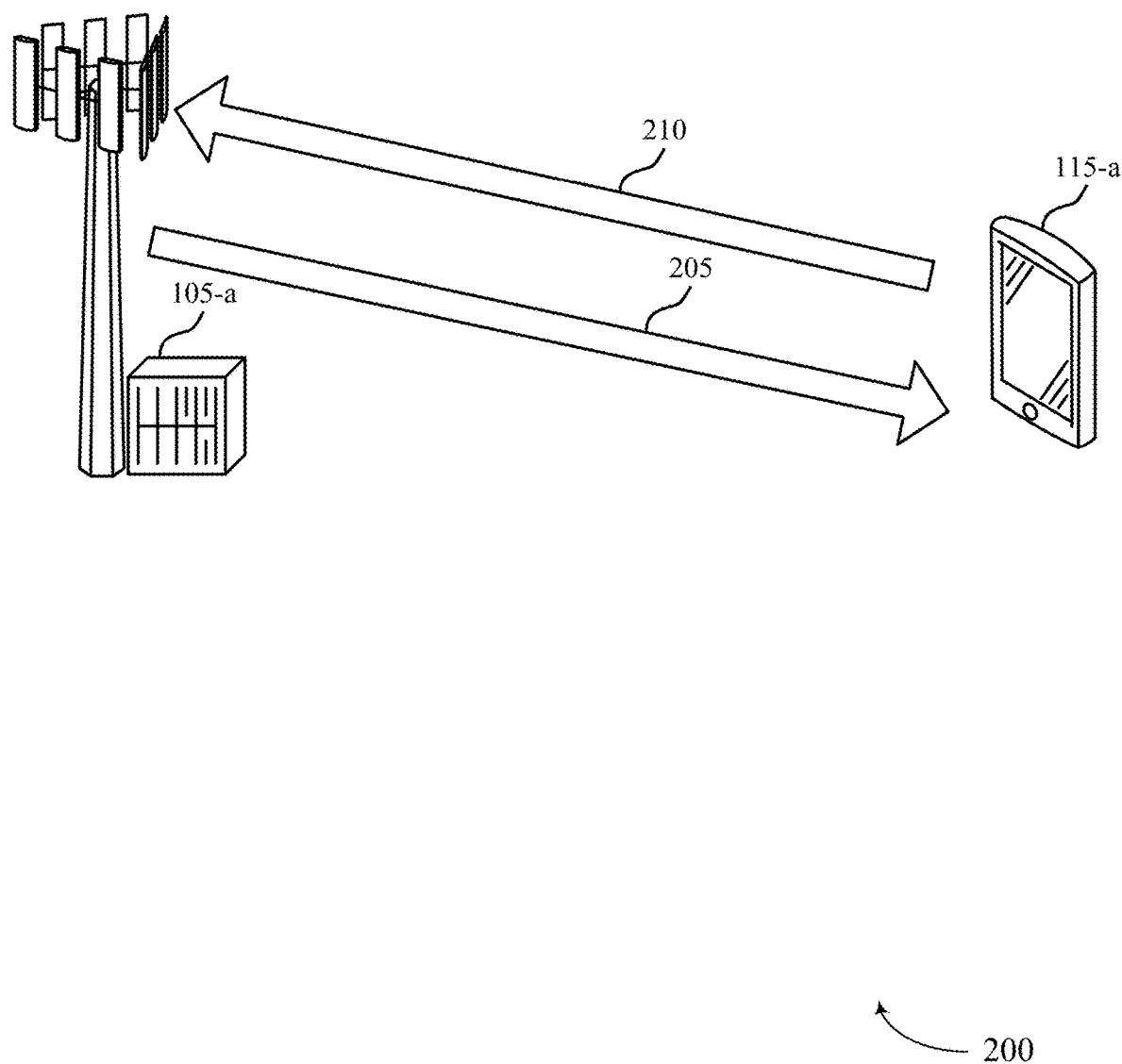
FIG. 2 illustrates an example of a wireless communications system that supports batch-based feedback in NR in accordance with aspects of the present disclosure.

FIG. 2 illustrates an example of a wireless communications system 200 that supports batch-based feedback in NR in accordance with aspects of the present disclosure. In some examples, the wireless communications system 200 may implement aspects of wireless communications system 100. The wireless communications system 200 may include a base station 105-a and a UE 115-a, which may be examples of the corresponding devices as described with reference to FIG. 1. In one example, the base station 105-a may be referred to as a transmitter and the UE 115-a may be referred to as a receiver. In some implementations, the UE 115-a and the base station 105-a may operate in a mmW spectrum and/or using NR technologies.

In some wireless systems (for example, NR wireless systems, such as wireless communications system 200), the UE 115-a and the base station 105-a may support low latency and high throughput communications. In some examples, different types of communications may entail different traffic thresholds. Table 1 represents a table showing different traffic thresholds for different types of traffic in an NR wireless system. For example, an NR system (such as, wireless communications system 200) may support enhanced mobile broadband (eMBB) applications, ultra-reliable low latency communications (URLLC), and extended reality (XR) communications. Various applications and/or communications may be associated with various traffic thresholds. In some implementations, one or more XR applications (for example, applications using XR traffic thresholds) may include cloud reality applications, virtual reality applications, gaming applications, etc. As discussed herein, the XR applications may be associated with a high throughput (for example, throughput for rendering videos) and a low latency. That is, such XR applications may be associated with a high bit rate, high reliability, and a low latency. In some implementations, XR applications may also include interactive video sessions (such as, gaming or head mounted display). As described with reference to Table 1, each XR application may be associated with a packet delay budget and a packet error rate. For example, an XR application (or an XR communication session) may be associated with a packet delay budget ranging between 5 ms and 25 ms (for example, 10 ms) and a packet error rate less than or equal to $10^{-3}$ (such as, $10^{-6}$).

TABLE 1

| Traffic Type | 5QI Value | Packet Delay Budget | Packet Error Rate | Default Maximum Data Burst Volume | Example Services |
|---|---|---|---|---|---|
| eMBB | 1 | 100 ms | $10^{-2}$ | N/A | Conversational voice |
| eMBB | 2 | 150 ms | $10^{-3}$ | N/A | Conversational video (for example, live streaming) |
| eMBB | 6, 8, 9 | 300 ms | $10^{-6}$ | N/A | Video (for example, buffered streaming) Transmission Control Protocol-based service (for example, e-mail, chat, file transfer protocol, peer-to-peer file sharing, progressive video) |
| ... | ... | ... | ... | ... | ... |
| XR | 80 | 10 ms | $10^{-6}$ | N/A | Low latency eMBB applications (such as, augmented reality) |
| URLLC | 81 | 5 ms | $10^{-5}$ | 160 B | Remote control |
| ... | ... | ... | ... | ... | ... |

Additionally, Table 2 illustrates multiple use cases for XR applications. For example, an XR application may include a virtual reality split rendering (for example, gaming applications). In such implementations, a head mounted display may be attached with a server that renders a video frame. In such examples, a processing of the video frame may be performed at the server (such as, a server hosting XR applications). Upon successful processing of the video frame, a communication link (such as, a 5G communication link) may convey the processed video frame from the server to the head mounted display. For a successful delivery of the processed video frame in XR applications, the 5G communication link may be associated with a high throughput and a low latency (for example, high traffic threshold for XR applications). Additionally or alternatively, a second use case for XR applications may include augmented reality split computation. In augmented reality applications, an entire view of a user may not be covered by a rendered video. Instead, a rendered video (such as, video rendered from a server) may be augmented over a display of a user device (for example, a camera feed). As depicted in Table 2, a third use case for XR applications may include cloud gaming. In some examples, cloud gaming may be associated with a high throughput and a low latency communication link. In sum, XR applications may be subjected to higher traffic thresholds, and it may be beneficial for the NR wireless communications system (such as, wireless communications system 200) to be provide batch-based feedback for the traffic associated with XR applications.

TABLE 2

|  | Virtual Reality split rendering | Augmented Reality split computation | Cloud Gaming |
|---|---|---|---|
| Head Mounted Display/Device | Head-mounted with 5G modem attached | Head-mounted with USB/Bluetooth connection to "Puck" or Smartphone with 5G modem | 5G Smartphone or Tablet |
| 5G usage Location | QoS Enterprise-Indoor, Residential-Indoor, Outdoor | QoS Enterprise-Indoor, Outdoor | OTT/QoS Outdoor |
| Mobility | Limited to head movements and restricted body movements, Hi-speed (VR in the back of a car) | Pedestrian, Hi-speed | Static, Hi-speed |

Existing wireless communications systems are configured to treat data packets as a stream of bits without the knowledge of the batches (such as, processing groups or files) associated with the packets. In some examples, XR applications, one or more transmitted packets may be in the form of processing batches (such as, processing groups, processing units, or files). As one example, packets in a video frame in an XR application may be considered as a processing batch (or file). In some examples, the processing batches may each be associated with a file error rate. For example, a file error rate may be based on a number of packets in each processing batch (or file), a reliability threshold associated with each processing batch (for example, whether a file includes an I-frame or a P-frame), or a combination thereof. Some wireless communications systems do not have a method to support a robust method for transmission of processing batches.

To overcome the limitation of some wireless communications systems, according to one or more aspects of the present disclosure, the wireless communications system 200 may be configured to group packets of the same file as a processing batch or a processing group. Additionally, the one or more aspects of the present disclosure describe methods for providing processing batch-based feedback. As depicted in the example of FIG. 2, the wireless communications system 200 includes a base station 105-*a* and a UE 115-*a*. The base station 105-*a* and the UE 115-*a* may employ HARQ feedback techniques to indicate whether data (such as, data included in a processing batch) have been received correctly at the UE 115-*a*. For example, the base station 105-*a* may transmit one or more downlink transmissions (e.g., downlink messages) to the UE 115-*a* on resources of a carrier 205. Accordingly, the UE 115-*a* may transmit an indication of whether the one or more downlink transmissions were received and decoded correctly. For example, the UE 115-*a* may provide feedback related to decoding the downlink transmissions on resources of a carrier 210. In some cases, the carrier 205 and the carrier 210 may be the same carrier. In some cases, the carrier 205 and the carrier 210 may be CCs, and a number of different CCs may be used for communications between the UE 115-*a* and the base station 105-*a*. In some cases, the carrier 205 and the carrier 210 may use licensed spectrum, shared or unlicensed spectrum, or combinations thereof. When using unlicensed or shared spectrum, the UE 115-*a* and the base station 105-*a* may use a contention-based access technique (e.g., a LBT procedure) to determine if a channel is available prior to initiating transmissions.

In some wireless communications systems, the base station 105-*a* may transmit a downlink control information on the carrier 205 that schedules one or more downlink transmissions and provides feedback parameters within the downlink control information. In some cases, the UE 115-*a* may respond with one or more feedback report(s) on carrier 210. The downlink control information may be included in a downlink or uplink grant (e.g., in a downlink message such as a physical downlink control channel (PDCCH) transmission), or UE 115-*a* may be explicitly triggered to transmit a feedback report (e.g., in a separate downlink control information message). According to one or more aspects of the present disclosure, when the information is present, the UE 115-*a* may be indicated, by the base station 105-*a*, to provide the feedback report based on assignment information (such as one or more batch-based feedback parameters) associated with a batch of downlink transmissions (e.g., that may be associated with packets) that are configured to be processed together by the UE 115-*a* (such as a file). For example, the base station 105-*a* may configure the UE 115-*a* for batch-based feedback, and the UE 115-*a* may construct a codebook based on receiving the assignment information, and transmit an acknowledgement feedback based on the codebook construction.

In some cases, the wireless communications system 200 may operate in an NR system, which may allow for two modes of transmission of a HARQ-ACK codebook, which may include a semi-static (e.g., Type 1) mode, and a dynamic (e.g., Type 2) mode. Both semi-static and dynamic modes may be used by carrier aggregation (CA) or non-CA operation. In some cases, the semi-static mode of a HARQ-ACK codebook for CA operation may be determined by a configured number of downlink cells. In some examples, the configured number of downlink cells may be determined per physical uplink control channel (PUCCH) group. In some examples, the semi-static mode of the HARQ-ACK codebook for CA operation may be determined by a configured number of code block groups per transport block for each configured downlink cell, a maximum number of transport block-based on a configuration of each downlink cell, or a combination thereof.

In some cases, a downlink control information may include an indication of one or more downlink assignment indexes (DAIs) that may provide a counter of downlink assignments (e.g., transport block-based or code block group-based downlink transmissions) that are to be reported in a feedback report. In some cases, the DAIs may include a counter DAI (cDAI) that may indicate an accumulated number of downlink transmissions (e.g., a number of transport blocks from which a number of code blocks may be determined based on a configured number of code block groups in each transport block (e.g., 4 code block groups in each transport block)) within each downlink transmission group. In some cases, the DAIs may also include a total DAI (tDAI), that may indicate a total number of DAIs across multiple CCs or downlink transmission groups. The tDAI may thus provide an indication of whether the UE 115-*a* may have missed a downlink control information for a carrier. In some wireless communications systems, an association set may be determined based on the configured set of HARQ-ACK timings, where the HARQ-ACK payload is ordered based on a downlink time index.

In some cases, a DAI is not included in downlink grants. In some cases, a number of DAI, tDAI, cDAI, or a combination thereof may be indicated. For example, in CA operation, the tDAI may be included in a downlink assignment. In some examples, for dynamic HARQ-ACK codebook construction and for uplink control information on PUSCH, the cDAI may be utilized in downlink assignment and an uplink DAI may be used in an uplink grant. In some cases, a UE may determine a HARQ-ACK codebook size based on the uplink DAI and the cDAI. In an example of a single HARQ-ACK codebook, a single uplink DAI field of 2 bits may be included in an uplink grant. In an example of two HARQ-ACK sub-codebooks (e.g., one for code block group based HARQ-ACK and one for transport block-based HARQ-ACK), two uplink DAI fields may be included in an uplink grant. In some cases, each of the two uplink DAI fields may include two bits.

In some examples, for constructing a dynamic HARQ-ACK codebook for CA operation with code block group configuration for one serving cell (e.g., per PUCCH group), the UE 115-*a* may be configured to generate two HARQ-ACK sub-codebooks and combine the two HARQ-ACK sub-codebooks to generate a single HARQ-ACK codebook (e.g., combined HARCH-ACK codebook with the sub-codebook for the transport block based HARQ-ACK placed first). In some cases, a first sub-codebook of the two HARQ-ACK sub-codebooks may be associated with a transport block-based HARQ-ACK and a second sub-codebook of the two HARQ-ACK sub-codebooks may be associated with code block group-based HARQ-ACK.

According to one or more aspects of the present disclosure, the wireless communications system 200 may be configured to implement a batch-based HARQ acknowledgement (e.g., HARQ acknowledgement for each file). In some cases, the wireless communications system 200 may implement the batch-based HARQ acknowledgement in addition to the DAIS. Thus, the wireless communications system 200 may provide for transport block-based HARQ for efficient over-the-air operation as well as batch-based HARQ to ensure that an entire processing batch (such as a file or a group of packets) is delivered successfully at the UE 115-a. To implement a batch-based HARQ acknowledgement, the present disclosure provides for group assignment indexes (GAIs). In some cases, a GAI may also be referred to as a batch assignment index. In some examples, the GAIs may include a counter GAI (such as, GAI_counter) and a total GAI (such as, GAI_total). In some cases, the GAI_counter may be referred to as a batch assignment index counter and the GAI_total may be referred to as a total batch assignment index.

In some implementations, the wireless communications system 200 may be configured to implement a policy on file handling. For example, the base station 105-a and the UE 115-a may determine that a processing batch (or file) is usable if all packets of the file are received. In some implementations, the wireless communications system 200 may determine a batch error if all packets associated with a processing batch (or file) are not successfully received at the UE 115-a. One or more aspects of the present disclosure provide for the UE 115-a to determine assignment information for processing batch-based feedback for a batch of downlink transmissions (such as a processing batch or a file) that are configured to be processed together by the UE 115-a. For example, the UE 115-a may receive a downlink control information (e.g., via carrier 205) and may identify a batch assignment index counter (e.g., GAI_counter), or a total batch assignment index (e.g., GAI_total), or both. The UE 115-a may additionally receive a downlink transmission from the batch of downlink transmissions. That is, the UE 115-a may receive a packet transmission associated with a file (e.g., associated with packets) that is configured to be processed together at the UE 115-a. Upon receiving the downlink transmission from the batch of downlink transmissions, the UE 115-a may construct a HARQ-ACK codebook based on the batch assignment index counter (e.g., GAI_counter), or the total batch assignment index (e.g., GAI_total), or both. In some cases, the UE 115-a may determine an acknowledgement feedback based on the codebook and a result of decoding the downlink transmission from the batch of downlink transmissions. In some cases, the UE 115-a may transmit the acknowledgement feedback to the base station 105-a. Thus, one or more aspects of the present disclosure provide for mechanisms for indicating a GAI (or assignment index) and constructing a HARQ codebook based on the GAI.

Figure 3:
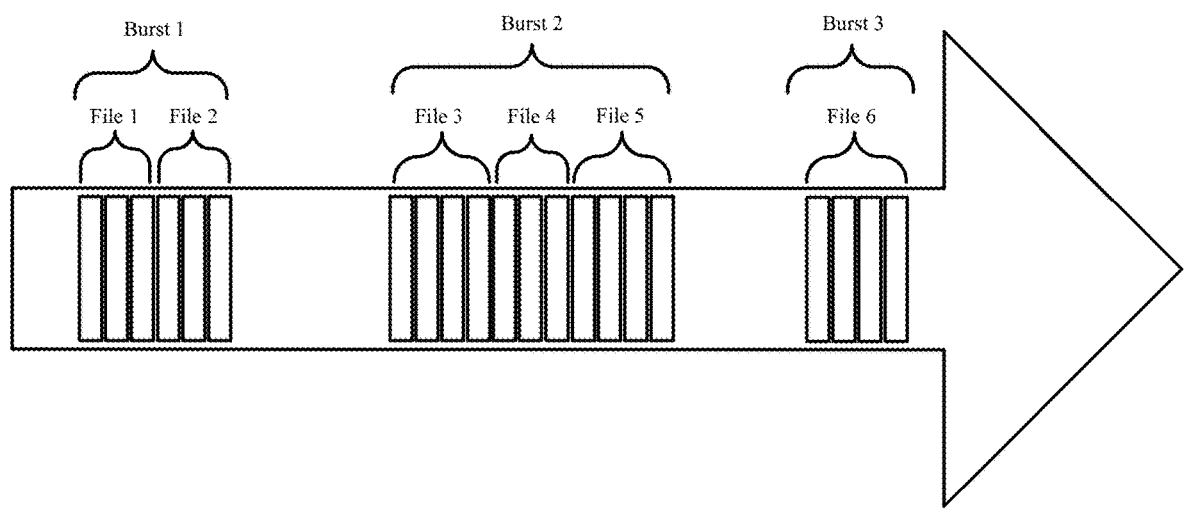
FIG. 3 illustrates an example of a traffic flow that supports batch-based feedback in NR in accordance with aspects of the present disclosure.
Figure 3:
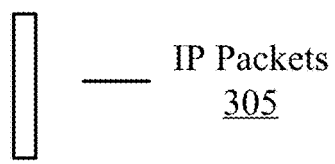

FIG. 3 illustrates an example of a traffic flow 300 that supports batch-based feedback in NR in accordance with aspects of the present disclosure. In some examples, the traffic flow 300 may implement aspects of wireless communications system 100 and wireless communications system 200 as described with reference to FIG. 1 and FIG. 2.

The traffic flow 300 may include multiple IP packets 305. In some implementations, NR wireless systems (such as, the wireless communications system 200 supporting XR applications) may be configured to group one or more IP packets 305 into one or more processing batches (or files). As described with reference to FIG. 2, the wireless communications system may group the one or more IP packets 305 based on a reliability threshold. In some cases, a first group of packets may be associated with an I-frame, and a second group of packets may be associated with a P-frame. In such an example, the first group of packets may have a higher reliability threshold (such as, high priority) than the second group of packets. Additionally or alternatively, a wireless communications system may group the one or more IP packets 305 based on a delivery deadline associated with each IP packet 305. In some implementations, a delivery deadline of a packet may be interpreted as a sum of a time of arrival of the packet (for example, at a base station 105) and a packet delay budget associated with the packet. In some cases, a group of packets having the same (or similar) delivery deadline may be grouped together as one processing batch (or file). In some implementations, the wireless communications system may group the one or more IP packets 305 based on a policy of handling the processing batches. For example, the wireless communications system may include one or more IP packets 305 in a processing batch (or file) if the processing batch (such as, a video frame) is usable at a receiver (such as, UE 115) when all IP packets are successfully received. In some examples, the wireless communications system may include one or more IP packets 305 in a processing batch (or file) if a policy indicates that a contiguous stream of IP packets 305 up to the first packet in error can be used at the receiver.

In the example of FIG. 3, the wireless communications system generates 6 files (or processing batches). In some implementations, each file may include a set of IP packets 305 jointly processed by an application (such as, an XR application). In some examples, the wireless communications system may determine the IP packets 305 associated with a file based on a maximum transmission unit (MTU) setting on an IP stack interfacing the application. In some examples, the wireless communications system may further fragment the IP packets 305 into smaller IP packet fragments (not shown). In some implementations, a burst of files (or processing batches) may be referred to as files generated by an application at the same (or similar) time. As depicted in the example of FIG. 3, the wireless communications system generates File 1 and File 2 at a same (or similar) time. Accordingly, File 1 and File 2 are included in first burst (Burst 1) of the traffic flow 300. Similarly, the wireless communications system (for example, an XR application included in the wireless communications system) may generate a second burst (Burst 2) including File 3, File 4, and File 5. Additionally, the wireless communications system may generate a third burst (Burst 3) including File 6. According to one or more aspects of the present disclosure, the wireless communications system may implement a method for acknowledging the receipt of each file (or processing batch). Specifically, the present disclosure provides for file-based (or processing batch-based) HARQ acknowledgement mechanisms. As depicted in the example of FIG. 2, a UE 115-a (e.g., first device) may receive GAIs that may provide a counter of downlink assignments (e.g., processing batch-based or file-based downlink transmissions). In some cases, the GAIs may include a batch assignment index counter (e.g., GAI_counter) that may indicate an accumulated number of assignments in a processing batch (e.g., number of assignments in a file), and a total batch assignment index (e.g., GAI_total), that may indicate a total number of assignments in a processing batch (or file).

Figure 4:
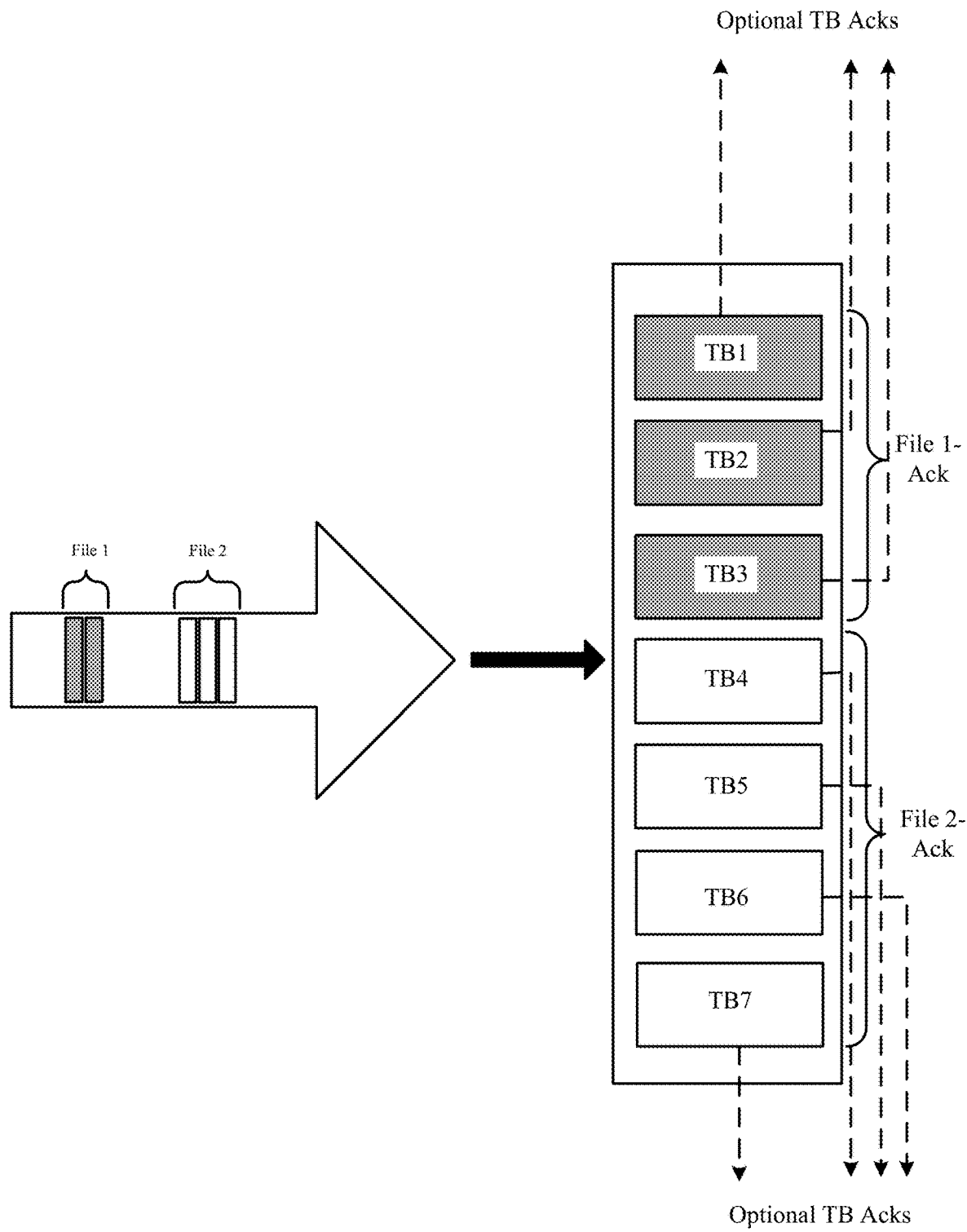
FIG. 4 illustrates an example of a mapping that supports batch-based feedback in NR in accordance with aspects of the present disclosure.

FIG. 4 illustrates an example of a mapping 400 that supports batch-based feedback in NR in accordance with aspects of the present disclosure. In some examples, the mapping 400 may implement aspects of wireless communications system 100 and wireless communications system 200 as described with reference to FIG. 1 and FIG. 2. In the example of FIG. 4, the mapping 400 may depict a mapping of packets (such as, data packets included in one or more processing batches) to one or more transport blocks based on a processing batch assignment for each packet. In one implementation, the packets may be mapped to one or more files (or processing batches) based on delivery deadlines associated with the packets.

According to one or more aspects of the present disclosure, a transmitter (such as, a UE 115 or a base station 105 as described with reference to FIG. 1) may map a first group of packets (such as, packets associated with File 1) to a first transport block (TB 1), a second transport block (TB 2), and a third transport block (TB 3). As depicted in the example of FIG. 4, the first group of packets may be associated with a first processing batch (or file). In some cases, the first processing batch may have an urgent deadline. In some examples, the transmitter may map a second group of packets (such as, packets associated with File 2) to a fourth transport block (TB 4), a fifth transport block (TB 5), a sixth transport block (TB 6), and a seventh transport block (TB 7)). In some examples, the second group of packets may be associated with a second processing batch (or file). In some cases, the second processing batch may have a non-urgent deadline. As described with reference to FIG. 4, the base station 105 may map the packets as previously described, and the UE 115 may receive the mapped packets. The UE 115 may then optionally transmit one or more transport block acknowledgements (for TB 1, TB 2, TB 3, TB 4, TB 5, TB 6, and TB 7).

According to one or more aspects of the present disclosure, the UE 115 may provide a processing batch-based (or file-based) acknowledgement to indicate a reception of a processing batch. For example, the UE 115 may transmit a first processing batch-based acknowledgement to acknowledge the reception of File 1, and a second processing batch-based acknowledgement to acknowledge the reception of File 2. In some cases, the UE 115 may provide the first processing batch-based acknowledgement and the second processing batch-based acknowledgement based on a HARQ-ACK codebook constructed using a batch assignment index counter (e.g., GAI_counter) or a total batch assignment index (e.g., GAI_total), or both.

As previously discussed with reference to FIGS. 2 and 3, the UE 115 (e.g., first device or receiving device) may determine assignment information (such as GAI_counter and/or GAI_total) for processing batch-based feedback for a batch of downlink transmissions (such as a file). In some cases, the UE 115 may receive a downlink control information from a base station 105 (e.g., second device or transmitting device), and may determine the assignment information from the downlink control information. In some cases, the UE 115 may determine a size of the batch of downlink transmissions (or group size) based on receiving semi-static or dynamic signaling from the base station 105 (e.g., via GAI_total). In some cases, the GAI_counter and/or GAI_total fields may be present in downlink assignments. In some examples, the UE 115 may identify a bit width associated with the batch assignment index counter (e.g., GAI_counter) based on receiving the downlink control information. The bit width may include one or two bits (e.g., 1-bit long or 2-bit long). In some examples, if a size of the batch of downlink transmissions (or a group size) is larger than a size of the bit width, then the UE 115 may determine an index associated with the downlink transmission (or a group index) based on a many-to-one mapping. In an example group size of 8 with a 2-bit GAI, a group index of 0 and 4 may map to 00 GAI, a group index of 1 & 5 may map to 01 GAI, group index of 2 and 6 may map to 10 GAI, and a group index of 3 and 7 may map to 11 GAI. In some cases, a probability of misinterpretation between 0 and 4 (or other combinations above) at the UE 115 is less than a threshold. The bit width may also be different in different formats associated with the downlink control information. For example, the formats associated with the downlink control information may include a fallback downlink control information including a single bit or a non-fallback downlink control information including two bits.

As previously discussed, the UE 115 may receive a downlink control information and may identify a total number of downlink transmissions included in the batch of downlink transmissions (e.g., via GAI_total). The GAI_total field may be included in both downlink downlink control information (e.g., when the UE 115 is configured with CA) and uplink downlink control information. In some implementations, the GAI_total may be configured to count the total number of assignments in a processing batch (or group), e.g., at a certain time (e.g., a slot), and the GAI_total may be updated in a following time instance (e.g., a slot). The bit width associated with the total batch assignment index (e.g., GAI_total) may be the same or smaller than the number of bits that may uniquely identify all indices in a processing batch (similar to GAI_counter). In some examples, one entry in the batch assignment index counter (e.g., GAI_counter) may indicate that a physical downlink control channel (PDSCH) is not part of the batch downlink transmissions. For example, the UE 115 may receive a second downlink transmission from the base station 105, and may determine that the second downlink transmission is not included in the batch of downlink transmissions based on the assignment indicator (e.g., based on the entry in the batch assignment index counter). In some examples, the UE 115 may receive a second assignment information (e.g., a separate group indicator) and the UE 115 may determine that the second downlink transmission is not included in the batch of downlink transmissions based on the second assignment information. In one example, all PDSCHs in a HARQ-ACK codebook may be associated with the same processing batch (or group).

According to one or more aspects, a base station 105 may configure the presence of the assignment information (e.g., GAI). For example, the base station 105 may determine that GAI can be configurable when processing batch-based transmission (or file-based transmission) is configured. In one example, the assignment information (e.g., GAI) may be configurable on a per-UE basis, or a per-CC basis. In one example, if the base station 105 configures GAI on a per-CC basis, then it may imply that processing batch-based transmission is not supported by or not explicitly indicated to the UE 115. In some implementations, the presence of GAI can be in addition to or separately from DAI. DAI can be indicated using the techniques described with reference to FIG. 2. In one example, when both GAI and DAI are indicated to a UE 115, the UE 115 may construct a first sub-codebook (e.g., HARQ-ACK sub-codebook) based on the batch assignment index counter (e.g., GAI_counter) or the total batch assignment index (e.g., GAI_total), or both. The UE 115 may also construct a second sub-codebook based on DAI (e.g., for non-batch-based transmissions, or code block based transmission). In some cases, the UE 115 may concatenate the first sub-codebook with the second sub-codebook for joint encoding and transmission. In some cases, the UE 115 may be configured to separately encode and transmit the downlink transmissions (e.g., batch-based transmissions and non-batch-based transmissions) due to different reliability requirements.

In some cases, the UE 115 may determine that a code block group is enabled for a first CC associated with the batch of downlink transmissions and the code block group is disabled for a second CC associated with the batch of downlink transmissions. In some cases, the UE 115 may construct the codebook associated with the processing batch-based feedback based on determining that the code block group is enabled for the first CC associated with the batch of downlink transmissions and the code block group is disabled for the second CC. For example, if a code block group is enabled for a CC, then the UE 115 may be configured to count a group index or a total number of assignments in a group to be the same as another CC (or CCs) without a code block group. That is, the UE 115 may be configured to count one assignment per CC.

Table 3 provides an example of slot-based PDSCH scheduling. Table 3 includes 3 CCs, and 3 slots in each CC. In the example of Table 3, the UE 115 is scheduled with non-batch-based PDSCH in {CC1, slot n+1} and {CC2, slot n+2}, and group-based PDSCH in {CC0, slot n}, {CC2, slot n}, {CC0, slot n+1}, and {CC1, slot n+2}. In this example, DAI is used to count for non-batch-based PDSCH as well as batch-based PDSCH, whereas GAI is used to count batch-based PDSCH. Although not demonstrated herein, it may be understood that DAI may not be used to count for non-batch-based PDSCH.

In this example, the slot n includes batch-based PDSCHs. In the slot n and in CC0, the tDAI value is 1 to indicate 2 total PDSCHs in the slot n (e.g., PDSCH in CC0 and PDSCH in CC2). The cDAI value is 0 in CC0 to indicate the first PDSCH in the slot n and the cDAI value is 1 in CC2 to indicate the second PDSCH in the slot n. Similarly, in the slot n and in CC0 and CC2, the GAI_total (GAI_t) value is 1 to indicate 2 total batch-based PDSCHs in the slot n (e.g., batch-based PDSCH in CC0 and batch-based PDSCH in CC2). The GAI_counter (GAI_c) value is 0 in CC0 to indicate the first batch-based PDSCH in the slot n and the GAI_c value is 1 in CC2 to indicate the second batch-based PDSCH in the slot n. Additionally, the slot n+1 includes one non-batch-based PDSCH (in CC1) and one batch-based PDSCH (in CC0). In the slot n+1 and in CC0 and in CC1, the tDAI value is 3 to indicate 4 total PDSCHs in the slots n and n+1. The cDAI value is 2 in CC0 to indicate the third PDSCH in the slot n+1 (e.g., counting the slot n) and the cDAI value is 3 in CC1 to indicate the fourth PDSCH in the slot n+1 (e.g., counting the slot n). Similarly, in the slot n+1 and in CC0 and CC1, the GAI_t value is 2 to indicate three batch-based PDSCHs in the slot n+1 (e.g., counting the slot n). The GAI_c value is 2 in CC0 to indicate the third batch-based PDSCH in the slot n+1 (e.g., counting the slot n), and the GAI_c value is x in CC1 to indicate that no batch-based PDSCH is present in the slot n+1 and CC1.

In the slot n+2 and in CC1 and in CC2, the tDAI value is 1 to indicate 6 total PDSCHs in the slots n, n+1, and n+2. The cDAI value is 0 in CC1 to indicate the fifth PDSCH in the slot n+2 (e.g., counting the slots n and n+1) and the cDAI value is 1 in CC2 to indicate the sixth PDSCH in the slot n+2 (e.g., counting the slots n and n+1). Similarly, in the slot n+2 and in CC1 and CC2, the GAI_t value is 3 to indicate a total of four batch-based PDSCHs in the slot n+2 (e.g., counting the slots n and n+1). The GAI_c value is 3 in CC1 to indicate the fourth batch-based PDSCH in the slot n+2 (e.g., counting the slots n and n+1), and the GAI_c value is x in CC2 to indicate that no batch-based PDSCH is present in the slot n+2 and CC2.

TABLE 3

|      | Slot n | Slot n + 1 | Slot n + 2 |
| --- | --- | --- | --- |
| CC 2 | PDSCH<br>(cDAI = 1, tDAI = 1)<br>GAI_c = 1, GAI-t = 1) |  | PDSCH<br>(cDAI = 1, tDAI = 1<br>GAI_c = x, GAI-t = 3) |
| CC 1 |  | PDSCH<br>(cDAI = 3, tDAI = 3<br>GAI_c = x, GAI-t = 2) | PDSCH<br>(cDAI = 0, tDAI = 1<br>GAI_c = 3, GAI-t = 3) |
| CC 0 | PDSCH<br>(cDAI = 0, tDAI = 1<br>GAI_c = 0, GAI-t = 1) | PDSCH<br>(cDAI = 2, tDAI = 3<br>GAI_c = 2, GAI-t = 2) |  |

Additionally or alternatively, the UE 115 may indicate a HARQ feedback (e.g., the batch-based or group-level HARQ feedback) by performing a logical AND of each of the batch's HARQ feedback. That is, the UE 115 may be configured to transmit an acknowledgement if all members of the batch are acknowledged; otherwise, the UE 115 may be configured to transmit a negative acknowledgement for the entire batch. In some cases, the feedback may be concatenated to a transport block-based HARQ or transmitted separately. It may be possible that two or more processing batches (e.g., groups) may have interleaved (e.g., in time) transmissions. In such cases, a UE 115 may handle two or more batches simultaneously by determining a batch index based on receiving a downlink control information. In some cases, the batch index may indicate a second assignment information for the processing batch-based feedback for a second batch of downlink transmissions. The batch index may be included in an information field in the downlink control information. In some cases, the UE 115 may derive the batch index using two or more information fields in the downlink control information. In one example, the batch index may include an explicit batch index indicating the batch of downlink transmissions and the second batch of downlink transmissions.

In some examples, for handling two or more batches simultaneously, the base station 105 may indicate two or more GAIs. In some cases, instead of using two or more GAIs, the base station 105 may combine GAI with other information fields (e.g., HARQ process ID/CC index) to differentiate different batches of downlink transmissions (or groups). For example, a first batch of downlink transmissions may have 4 members and may be scheduled using HARQ process ID 0, 2, 3, 5 for initial transmission. In such a case, the UE 115 may be configured to continue using these HARQ process IDs for re-transmissions. Additionally, a second batch of downlink transmissions may have 6 members and may be scheduled using HARQ process ID 1, 4, 6, 7, 8, 9 for new transmissions and subsequent re-transmissions. In some cases, the UE 115 may be configured to differentiate between the first batch of downlink transmissions and the second batch of downlink transmissions. In such an example the UE may provide HARQ feedback separately for different batches of downlink transmissions, or drop an older group's HARQ response. In some cases, a base station 105 may also prohibit interleaved transmissions (e.g., transmissions that are at least partially overlapped in time) for two or more batches.

As discussed herein, acknowledgment feedback for PDSCH transmissions using GAI may provide for a group-based HARQ in XR applications in accordance with aspects of this disclosure.

Figure 5:
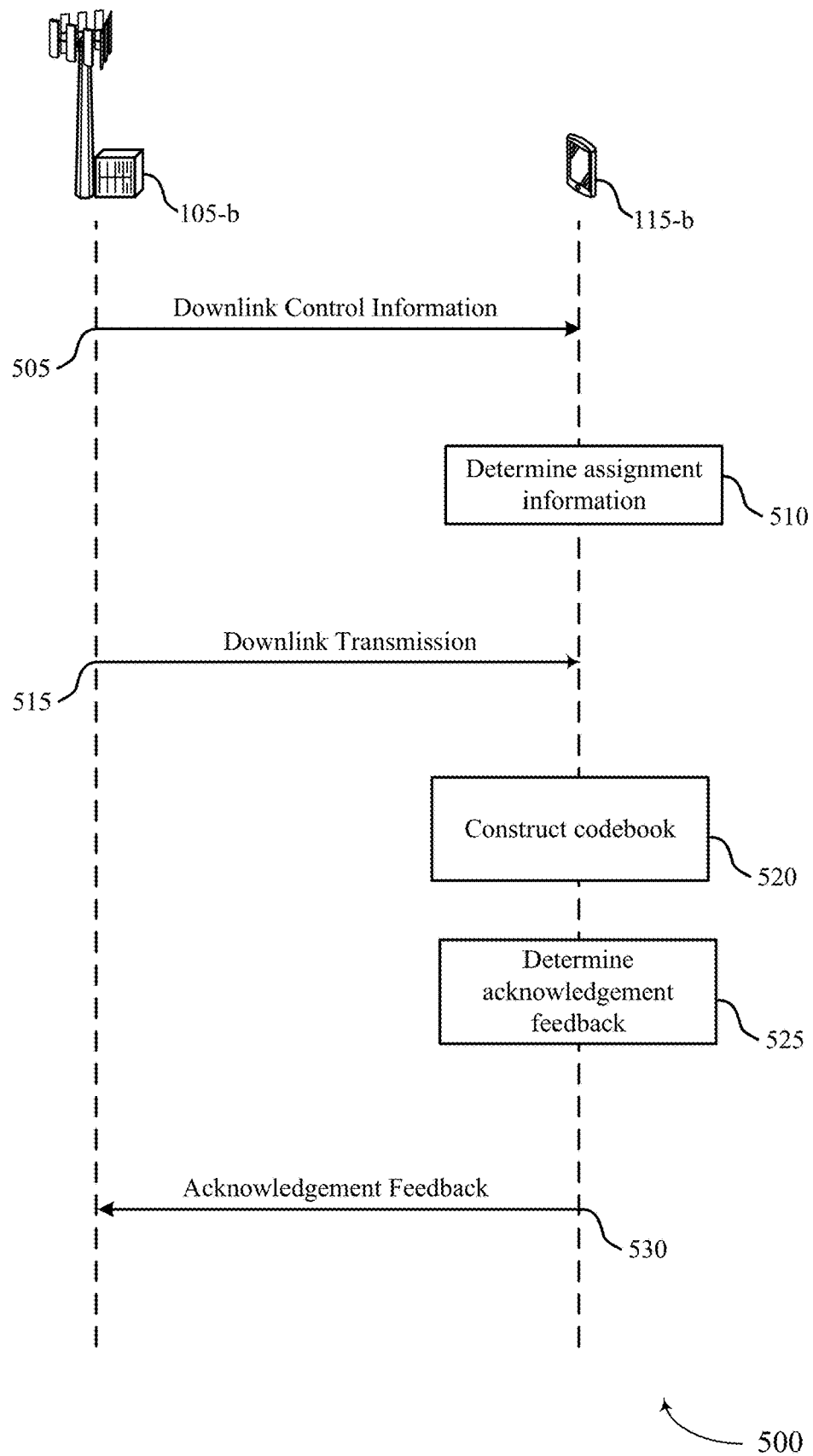
FIG. 5 illustrates an example of a process flow that supports batch-based feedback in NR in accordance with aspects of the present disclosure.

FIG. 5 illustrates an example of a process flow 500 that supports batch-based feedback in NR in accordance with aspects of the present disclosure. In some examples, process flow 500 may implement aspects of wireless communications system 100 and wireless communications system 200. The process flow 500 may include base station 105-b and UE 115-b, which may be examples of the corresponding devices described with reference to FIGS. 1 through 4. Base station 105-b and UE 115-b may support batch-based feedback in NR to achieve resource savings while maintaining delay requirements.

In the following description of the process flow 500, the operations between the UE 115-b and the base station 105-b may be transmitted in a different order than the exemplary order shown. The operations performed by UE 115-b or base station 105-b may be performed in different orders or at different times than the exemplary order shown. Certain operations may also be left out of the process flow 500, or other operations may be added to the process flow 500. Further, base station 105-b and UE 115-b are not meant to be representative, as the described features may be associated with any number of devices.

At 505, the UE 115-b (e.g., first device) may receive, from the base station 105-b (e.g., second device), a downlink control information. At 510, the UE 115-b may determine assignment information for processing batch-based feedback for a batch of downlink transmissions that are configured to be processed together by the UE 115-b. In some cases, the assignment information for the processing batch-based feedback may include a batch assignment index counter (e.g., GAI_counter), a total batch assignment index (e.g., GAI_total), or both.

At 515, the UE 115-b may receive, from the base station 105-b, a downlink transmission from the batch of downlink transmissions. At 520, the UE 115-b may construct a codebook associated with the processing batch-based feedback. In some cases, the codebook may be based on the assignment information and the downlink transmission.

At 525, the UE 115-b may determine acknowledgment feedback for the downlink transmission. In some cases, the acknowledgment feedback may be based on the codebook. At 530, the UE 115-b may transmit the acknowledgment feedback to the base station 105-b.

Figure 6:
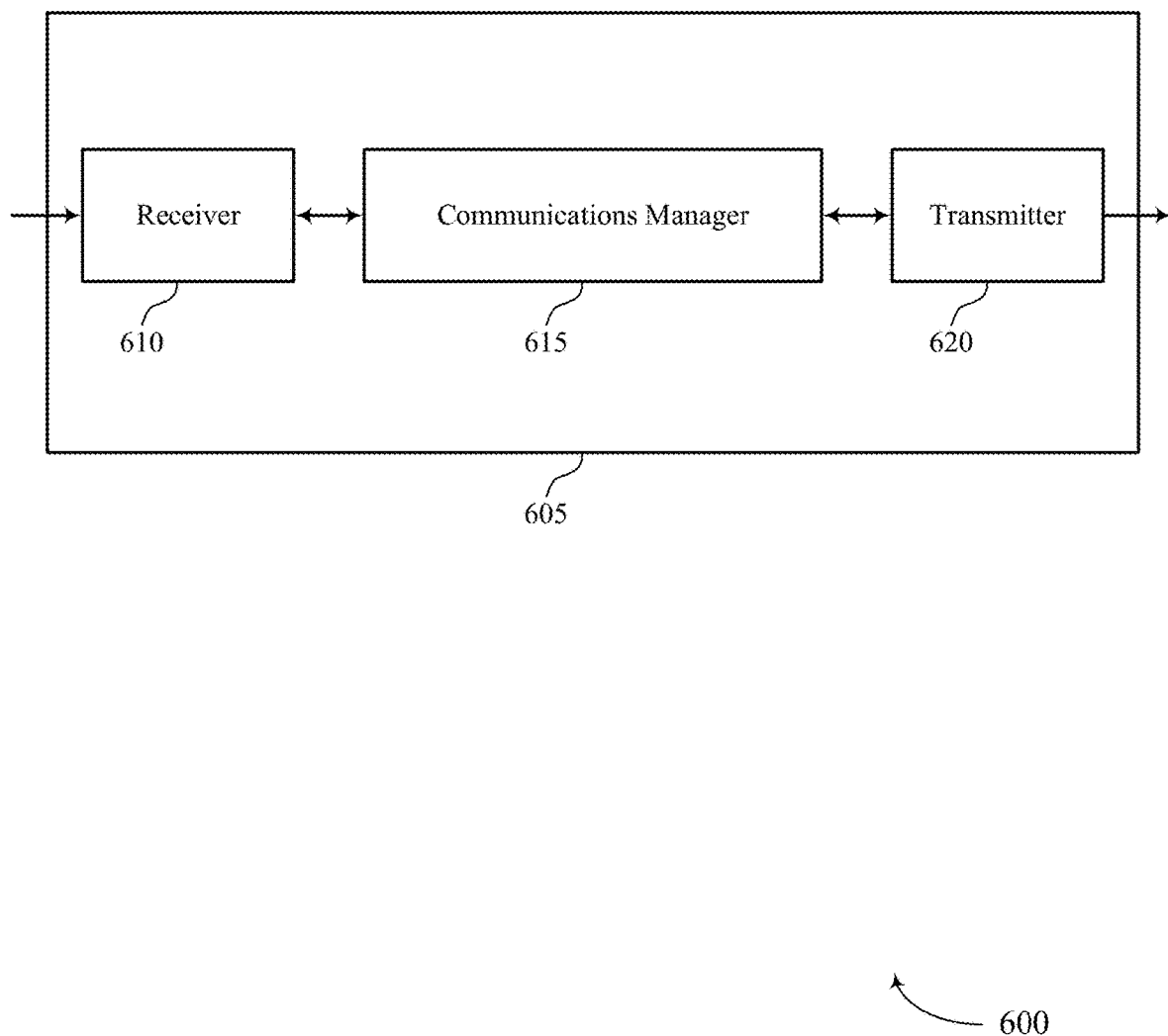
FIGS. 6 and 7 show block diagrams of devices that support batch-based feedback in NR in accordance with aspects of the present disclosure.

FIG. 6 shows a block diagram 600 of a device 605 that supports batch-based feedback in NR in accordance with aspects of the present disclosure. The device 605 may be an example of aspects of a UE 115 (e.g., first device) as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to batch-based feedback in NR, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine assignment information for processing batch-based feedback for a batch of downlink transmissions that are configured to be processed together by a first device. The communications manager 615 may receive, from a second device, a downlink transmission from the batch of downlink transmissions. The communications manager 615 may construct, based on the assignment information and the downlink transmission, a codebook associated with the processing batch-based feedback. The communications manager 615 may determine, based on the codebook, acknowledgment feedback for the downlink transmission. The communications manager 615 may transmit, to the second device, the acknowledgment feedback. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
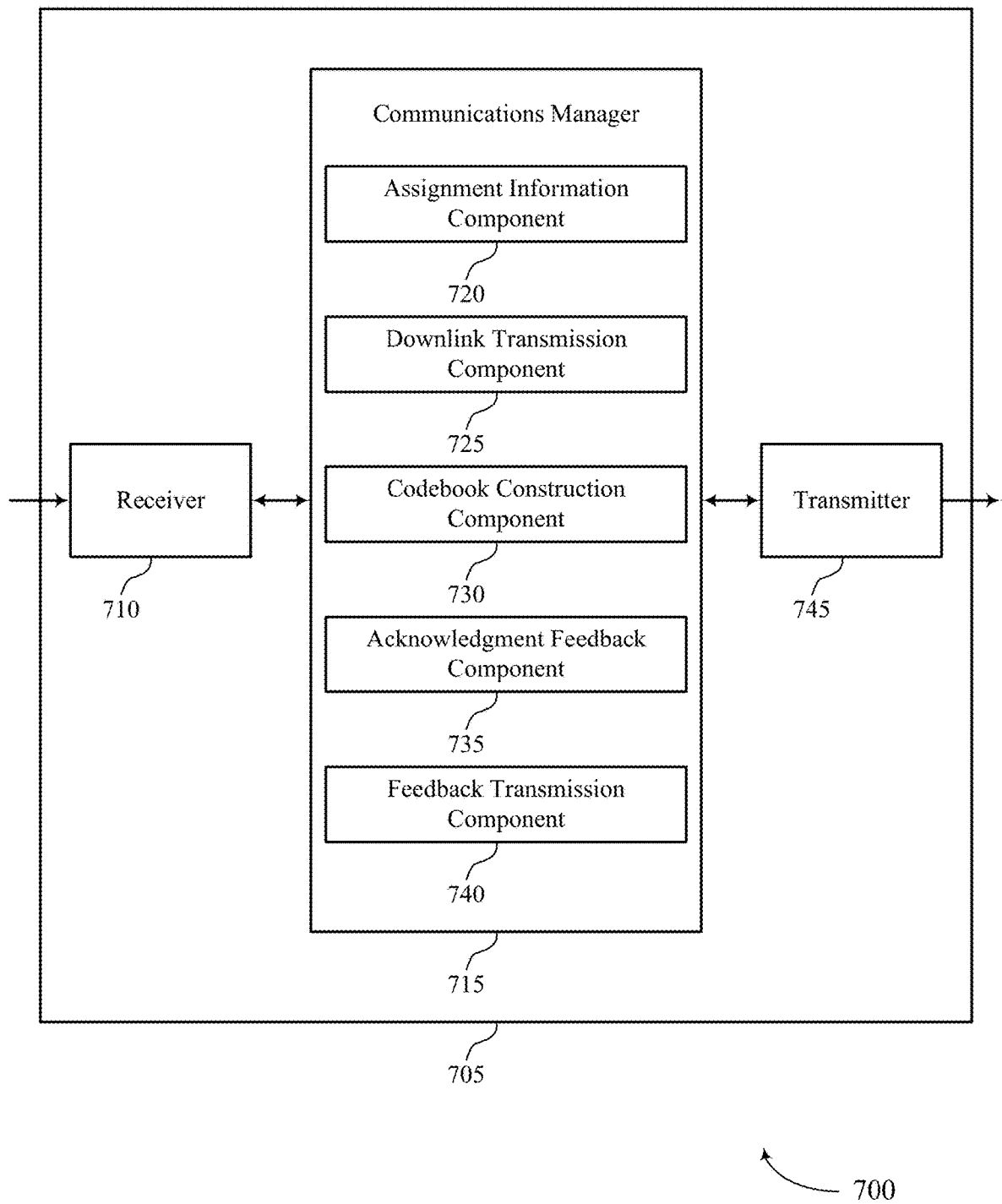

FIG. 7 shows a block diagram 700 of a device 705 that supports batch-based feedback in NR in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to batch-based feedback in NR, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an assignment information component 720, a downlink transmission component 725, a codebook construction component 730, an acknowledgment feedback component 735, and a feedback transmission component 740. The communications manager 715 may be an example of aspects of the communications manager 910 described herein.

The assignment information component 720 may determine assignment information for processing batch-based feedback for a batch of downlink transmissions that are configured to be processed together by a first device. The downlink transmission component 725 may receive, from a second device, a downlink transmission from the batch of downlink transmissions. The codebook construction component 730 may construct, based on the assignment information and the downlink transmission, a codebook associated with the processing batch-based feedback. The acknowledgment feedback component 735 may determine, based on the codebook, acknowledgment feedback for the downlink transmission. The feedback transmission component 740 may transmit, to the second device, the acknowledgment feedback.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
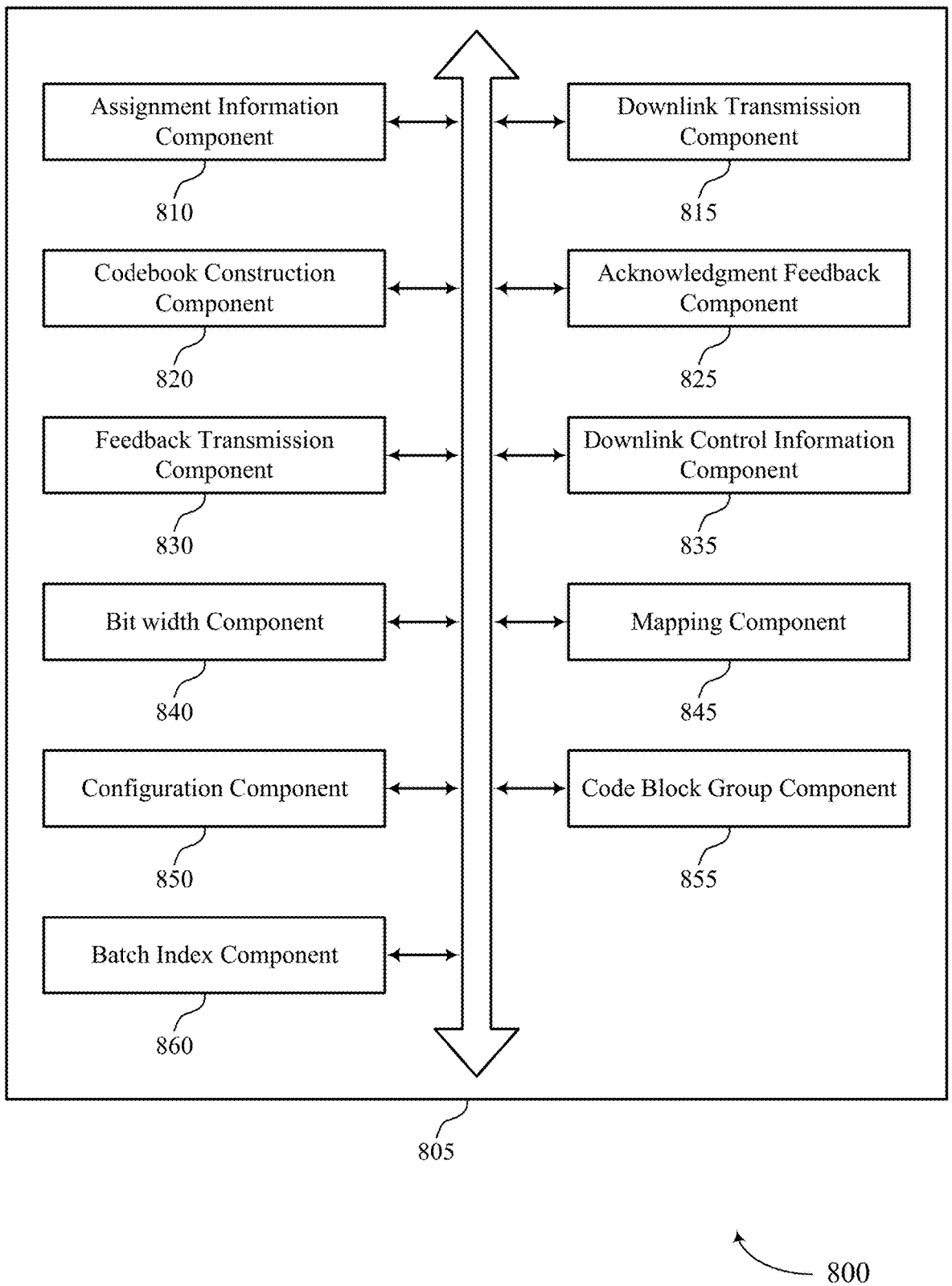
FIG. 8 shows a block diagram of a communications manager that supports batch-based feedback in NR in accordance with aspects of the present disclosure.

FIG. 8 shows a block diagram 800 of a communications manager 805 that supports batch-based feedback in NR in accordance with aspects of the present disclosure. The communications manager 805 may be an example of aspects of a communications manager 615, a communications manager 715, or a communications manager 910 described herein. The communications manager 805 may include an assignment information component 810, a downlink transmission component 815, a codebook construction component 820, an acknowledgment feedback component 825, a feedback transmission component 830, a downlink control information component 835, a bit width component 840, a mapping component 845, a configuration component 850, a code block group component 855, and a batch index component 860. Each of these modules may communicate, directly or indirectly, with one another (e.g., via one or more buses).

The assignment information component 810 may determine assignment information for processing batch-based feedback for a batch of downlink transmissions that are configured to be processed together by a first device. In some cases, the assignment information for the processing batch-based feedback includes a batch assignment index counter, a total batch assignment index, or both. The downlink transmission component 815 may receive, from a second device, a downlink transmission from the batch of downlink transmissions. The codebook construction component 820 may construct, based on the assignment information and the downlink transmission, a codebook associated with the processing batch-based feedback. The acknowledgment feedback component 825 may determine, based on the codebook, acknowledgment feedback for the downlink transmission. The feedback transmission component 830 may transmit, to the second device, the acknowledgment feedback.

The downlink control information component 835 may receive, from the second device, a downlink control information. In some examples, the codebook construction component 820 may determine the batch assignment index counter based on receiving the downlink control information, where constructing the codebook is based on determining the batch assignment index counter.

The bit width component 840 may identify a bit width associated with the batch assignment index counter based on receiving the downlink control information. The mapping component 845 may determine a mapping between an index associated with the downlink transmission and a value of the bit width associated with the batch assignment index counter, where constructing the codebook is based on determining the mapping.

In some cases, the bit width associated with the batch assignment index counter is based on a format associated with the downlink control information. In some cases, the format associated with the downlink control information includes a fallback downlink control information. In some cases, the fallback downlink control information includes a single bit. In some cases, the format associated with the downlink control information includes a non-fallback downlink control information. In some cases, the non-fallback downlink control information includes two bits.

In some examples, the mapping component 845 may determine that a first index with associated with a first downlink transmission and a second index with associated with a second downlink transmission are mapped to the same value of the bit width, where constructing the codebook is based on determining the mapping.

In some examples, the downlink control information component 835 may receive, from the second device, a downlink control information indicating a total number of downlink transmissions included in the batch of downlink transmissions. In some examples, the codebook construction component 820 may identify the total batch assignment index based on receiving the downlink control information, where constructing the codebook is based on identifying the total batch assignment index.

In some examples, the bit width component 840 may identify a bit width associated with the total batch assignment index based on receiving the downlink control information, where constructing the codebook is based on identifying the bit width associated with the total batch assignment index. In some cases, the bit width associated with the total batch assignment index is the same as a number of bits associated with uniquely identifying each downlink transmission of the total number of downlink transmissions. In some cases, the bit width associated with the total batch assignment index is less than a number of bits associated with uniquely identifying each downlink transmission of the total number of downlink transmissions.

In some examples, the downlink transmission component 815 may receive, from the second device, a second downlink transmission from the batch of downlink transmissions. In some examples, the codebook construction component 820 may determine, based on the assignment information, that the second downlink transmission is not included in the batch of downlink transmissions that are configured to be processed together by the first device, where constructing the codebook associated with the processing batch-based feedback is based on the determining. In some cases, the assignment information includes an entry in a batch assignment index counter indicating that the second downlink transmission is not included in the batch of downlink transmissions.

In some examples, the assignment information component 810 may determine second assignment information for the processing batch-based feedback for a second batch of downlink transmissions.

In some cases, the assignment information for the processing batch-based feedback is configured for each device associated with the second device, or each CC associated with the first device, or a combination thereof. In some examples, the downlink transmission component 815 may receive, from the second device, a second downlink transmission from the second batch of downlink transmissions. In some examples, the codebook construction component 820 may determine, based on the second assignment information, that the second downlink transmission is included in the second batch of downlink transmissions that are configured to be processed together by the first device, where constructing the codebook associated with the processing batch-based feedback is based on determining that the second downlink transmission is included in the second batch of downlink transmissions.

The configuration component 850 may determine that the first device is configured for a processing batch-based transmission based on determining the assignment information for the processing batch-based feedback, where constructing the codebook associated with the processing batch-based feedback is based on the determining.

In some examples, the codebook construction component 820 may determine second assignment information for a non-batch-based feedback for a second batch of downlink transmissions, where the non-batch-based feedback includes a code block group-based feedback, a non-group based feedback, or a combination thereof. In some examples, the downlink transmission component 815 may receive a second downlink transmission from the second device. In some examples, the codebook construction component 820 may construct, based on the second assignment information, a second codebook associated with the non-batch-based feedback.

In some cases, the second assignment information for the non-batch-based feedback includes the assignment information for the processing batch-based feedback. The code block group component 855 may determine that a code block group is enabled for a first CC associated with the batch of downlink transmissions and the code block group is disabled for a second CC associated with the batch of downlink transmissions, where constructing the codebook associated with the processing batch-based feedback is based on determining that the code block group is enabled for the first CC associated with the batch of downlink transmissions and the code block group is disabled for the second CC associated with the batch of downlink transmissions.

In some examples, the acknowledgment feedback component 825 may transmit a negative acknowledgment feedback indicating a negative acknowledgment feedback for at least one downlink transmission of the batch of downlink transmissions. In some examples, the acknowledgment feedback component 825 may determine a second acknowledgment feedback for the second downlink transmission, where transmitting the acknowledgment feedback further includes transmitting the second acknowledgment feedback.

In some examples, the downlink control information component 835 may receive, from the second device, a downlink control information. The batch index component 860 may determine a batch index based on receiving the downlink control information. In some examples, the assignment information component 810 may determine, based on the batch index, second assignment information for the processing batch-based feedback for a second batch of downlink transmissions, where the batch of downlink transmissions and the second batch of downlink transmissions are at least partially overlapped in time.

In some examples, the batch index component 860 may determine the batch index based on two or more information fields in the downlink control information. In some cases, the batch index is included in an information field in the downlink control information. In some cases, the batch index includes an explicit batch index indicating the batch of downlink transmissions and the second batch of downlink transmissions.

The actions performed by the communications manager 805 as described herein may be implemented to realize one or more potential advantages. For example, In some implementations, the communications manager 805 may decrease communication latency and enhance reliability and channel throughput for XR applications. The improvements in the communication link supporting XR applications (for example, decreasing communication latency and increasing reliability) may further save power and increase battery life at a UE 115 (for example, by reducing complexity and retransmissions).

Figure 9:
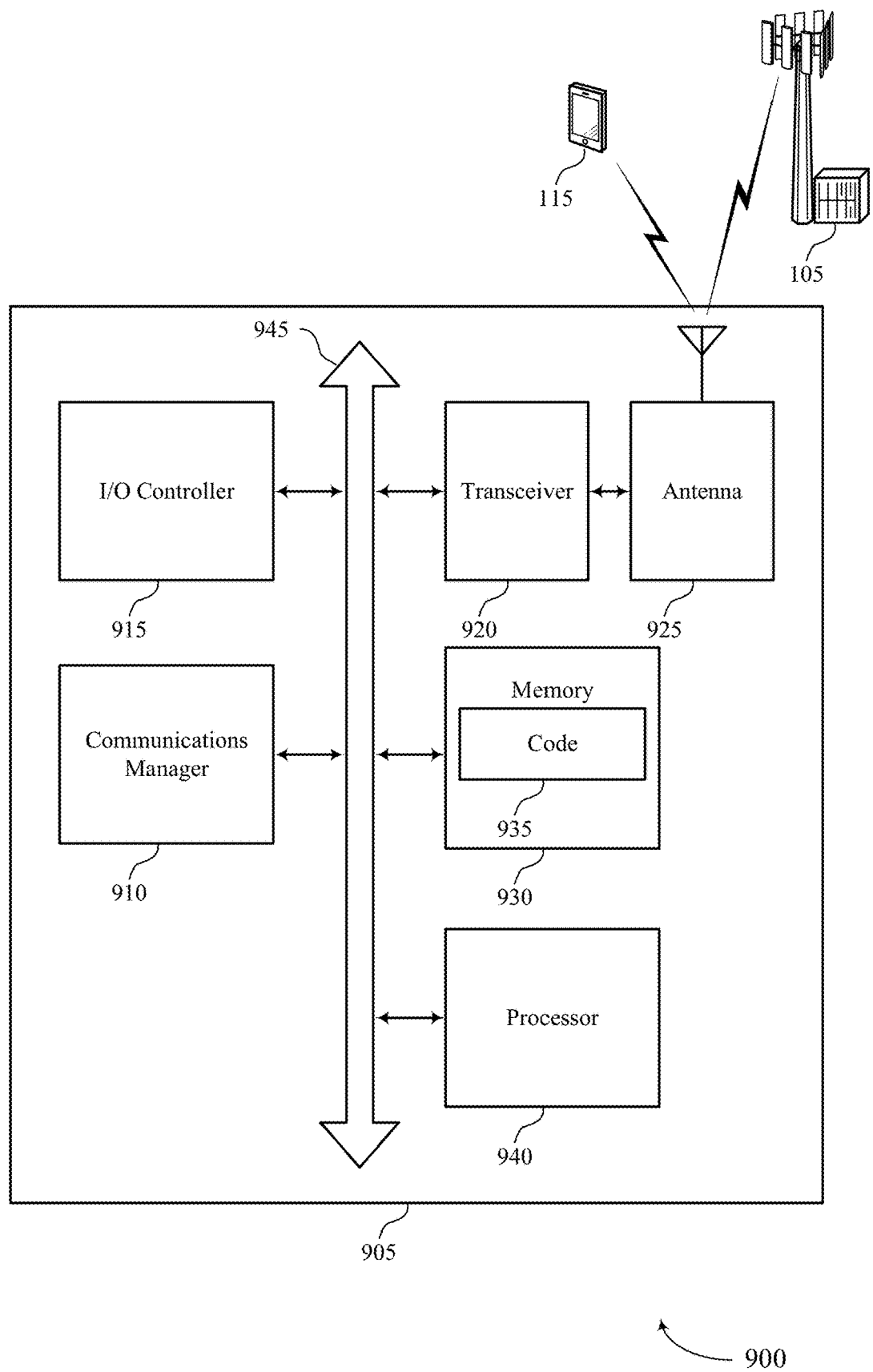
FIG. 9 shows a diagram of a system including a device that supports batch-based feedback in NR in accordance with aspects of the present disclosure.

FIG. 9 shows a diagram of a system 900 including a device 905 that supports batch-based feedback in NR in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine assignment information for processing batch-based feedback for a batch of downlink transmissions that are configured to be processed together by a first device. The communications manager 910 may receive, from a second device, a downlink transmission from the batch of downlink transmissions. The communications manager 910 may construct, based on the assignment information and the downlink transmission, a codebook associated with the processing batch-based feedback. The communications manager 910 may determine, based on the codebook, acknowledgment feedback for the downlink transmission. The communications manager 910 may transmit, to the second device, the acknowledgment feedback.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting batch-based feedback in NR).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
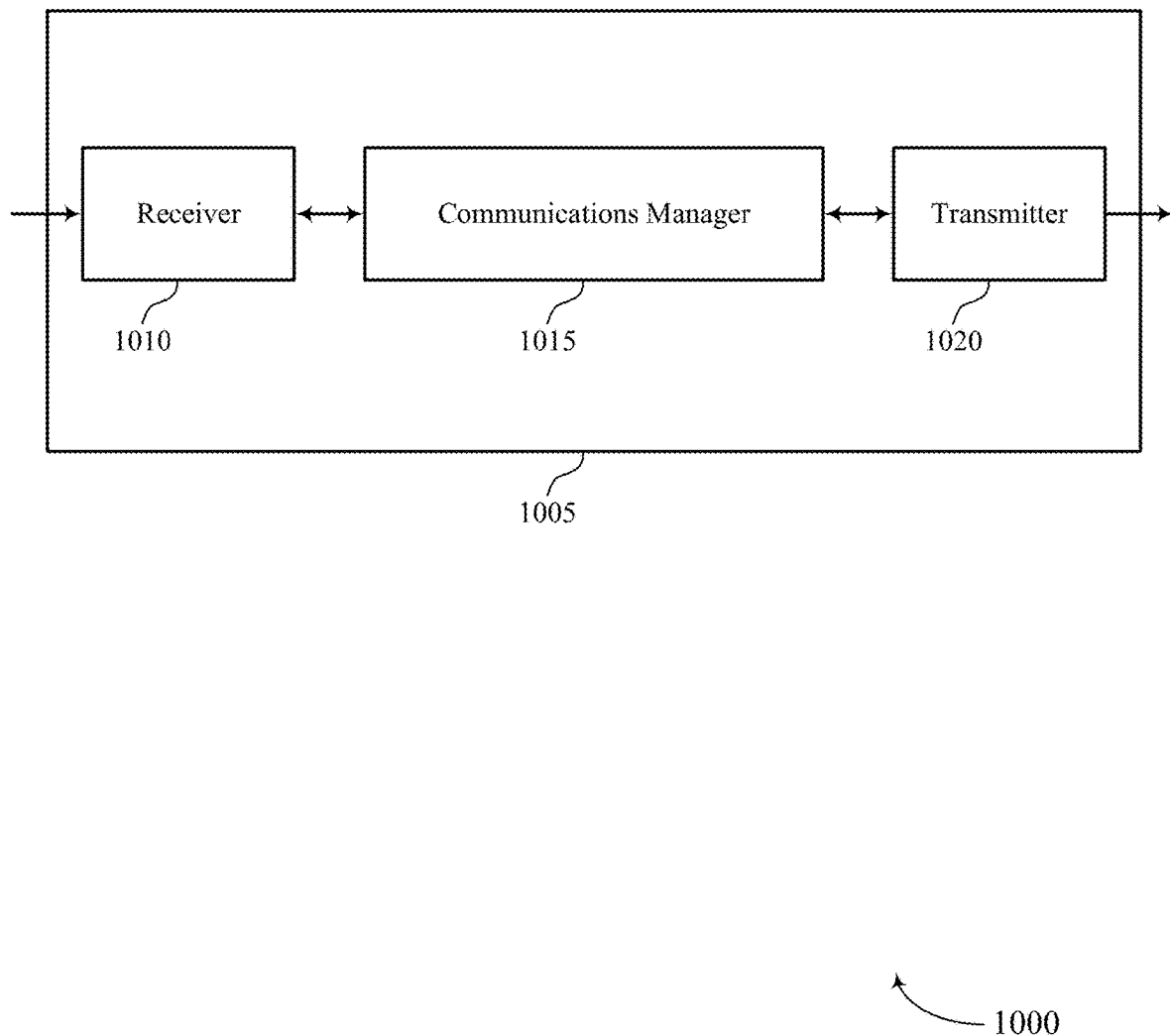
FIGS. 10 and 11 show block diagrams of devices that support batch-based feedback in NR in accordance with aspects of the present disclosure.

FIG. 10 shows a block diagram 1000 of a device 1005 that supports batch-based feedback in NR in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to batch-based feedback in NR, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine, assignment information for processing batch-based feedback for a batch of downlink transmissions that are configured to be processed together by a first device. The communications manager 1015 may transmit, to the first device, the assignment information and a downlink transmission from the batch of downlink transmissions. The communications manager 1015 may receive, from the first device, an acknowledgment feedback for the transmitted downlink transmission, where the acknowledgment feedback is based on a codebook associated with the assignment information for the processing batch-based feedback. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
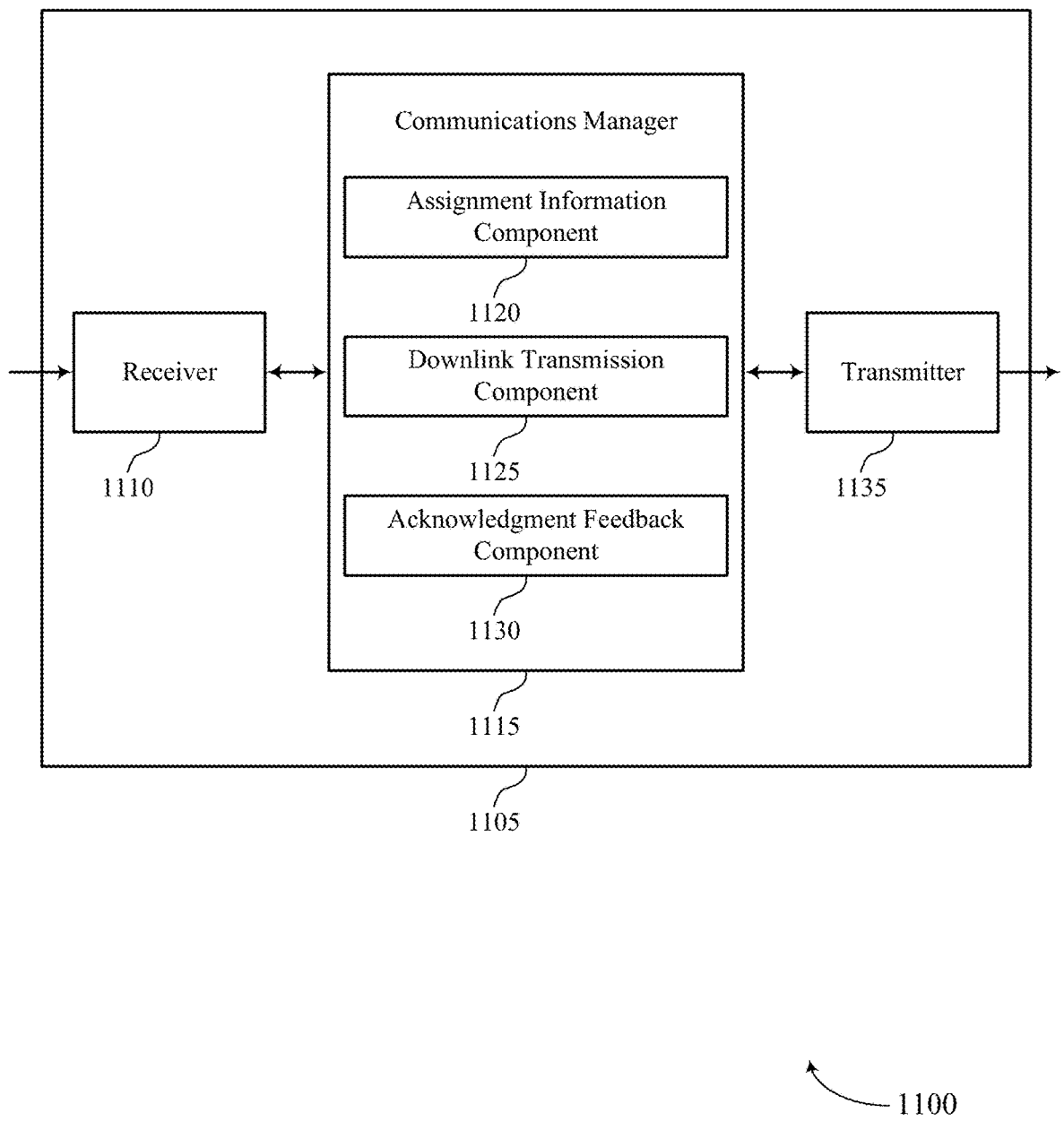

FIG. 11 shows a block diagram 1100 of a device 1105 that supports batch-based feedback in NR in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to batch-based feedback in NR, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an assignment information component 1120, a downlink transmission component 1125, and an acknowledgment feedback component 1130. The communications manager 1115 may be an example of aspects of the communications manager 1310 described herein.

The assignment information component 1120 may determine, assignment information for processing batch-based feedback for a batch of downlink transmissions that are configured to be processed together by a first device. The downlink transmission component 1125 may transmit, to the first device, the assignment information and a downlink transmission from the batch of downlink transmissions. The acknowledgment feedback component 1130 may receive, from the first device, an acknowledgment feedback for the transmitted downlink transmission, where the acknowledgment feedback is based on a codebook associated with the assignment information for the processing batch-based feedback.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
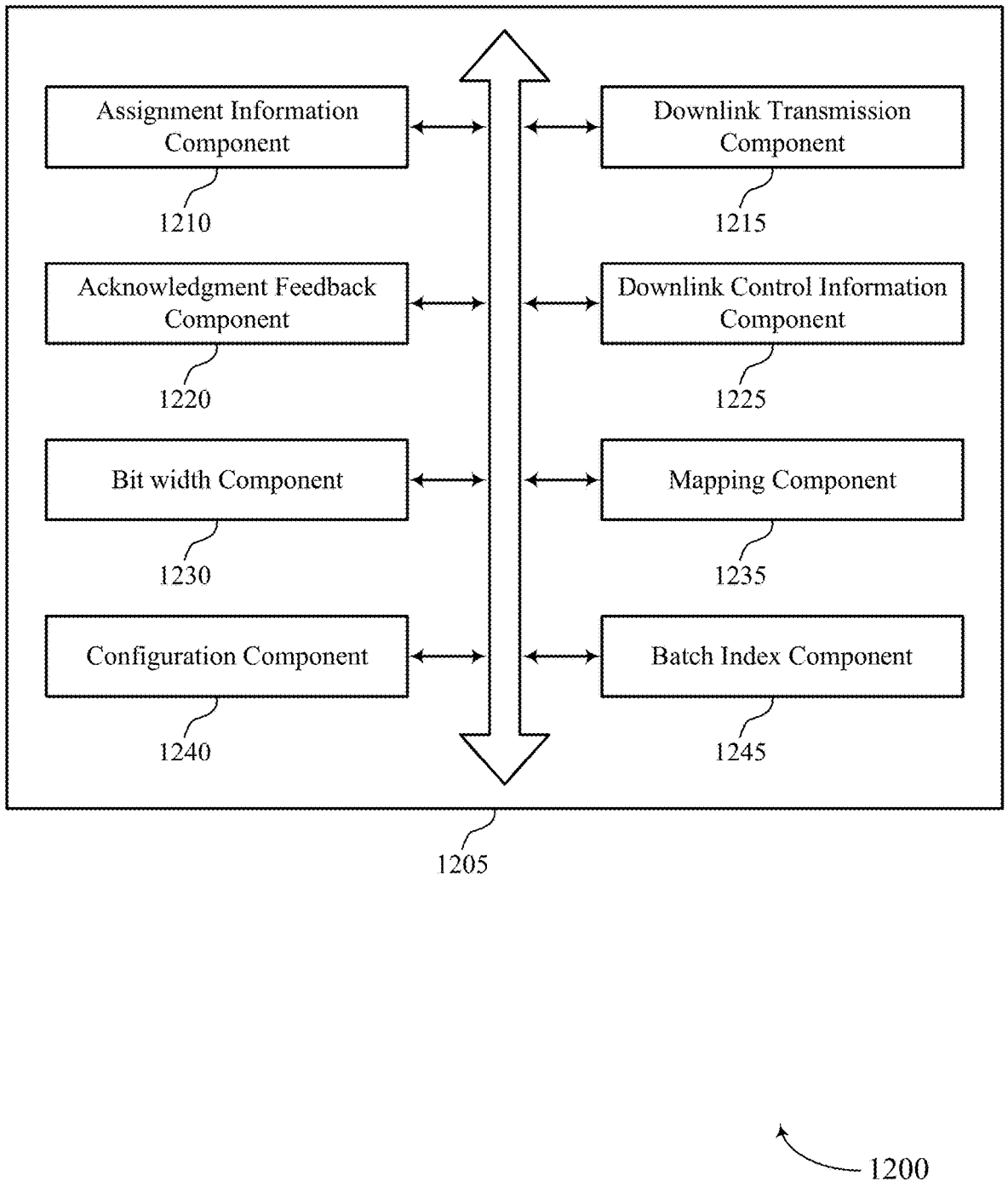
FIG. 12 shows a block diagram of a communications manager that supports batch-based feedback in NR in accordance with aspects of the present disclosure.

FIG. 12 shows a block diagram 1200 of a communications manager 1205 that supports batch-based feedback in NR in accordance with aspects of the present disclosure. The communications manager 1205 may be an example of aspects of a communications manager 1015, a communications manager 1115, or a communications manager 1310 described herein. The communications manager 1205 may include an assignment information component 1210, a downlink transmission component 1215, an acknowledgment feedback component 1220, a downlink control information component 1225, a bit width component 1230, a mapping component 1235, a configuration component 1240, and a batch index component 1245. Each of these modules may communicate, directly or indirectly, with one another (e.g., via one or more buses).

The assignment information component 1210 may determine, assignment information for processing batch-based feedback for a batch of downlink transmissions that are configured to be processed together by a first device. The downlink transmission component 1215 may transmit, to the first device, the assignment information and a downlink transmission from the batch of downlink transmissions. The acknowledgment feedback component 1220 may receive, from the first device, an acknowledgment feedback for the transmitted downlink transmission, where the acknowledgment feedback is based on a codebook associated with the assignment information for the processing batch-based feedback.

The downlink control information component 1225 may transmit, to the first device, a downlink control information, where the batch assignment index counter is included in the downlink control information, and where the codebook is based on the batch assignment index counter. In some examples, the downlink control information component 1225 may transmit, to the first device, a downlink control information indicating a total number of downlink transmissions included in the batch of downlink transmissions, where the total batch assignment index is included in the downlink control information, and where the codebook is based on identifying the total batch assignment index. In some cases, the assignment information for the processing batch-based feedback includes a batch assignment index counter, a total batch assignment index, or both.

The bit width component 1230 may identify a bit width associated with the batch assignment index counter based on receiving the downlink control information. In some examples, the bit width component 1230 may identify a bit width associated with the total batch assignment index based on transmitting the downlink control information, where the codebook is based on the bit width associated with the total batch assignment index. The mapping component 1235 may determine a mapping between an index associated with the downlink transmission and a value of the bit width associated with the batch assignment index counter, where the codebook is based on the mapping. In some examples, the mapping component 1235 may determine that a first index with associated with a first downlink transmission and a second index with associated with a second downlink transmission are mapped to the same value of the bit width, where the codebook is based on the determining.

In some cases, the bit width associated with the batch assignment index counter is based on a format associated with the downlink control information. In some cases, the format associated with the downlink control information includes a fallback downlink control information. In some cases, the fallback downlink control information includes a single bit. In some cases, the format associated with the downlink control information includes a non-fallback downlink control information. In some cases, the non-fallback downlink control information includes two bits. In some cases, the bit width associated with the total batch assignment index is the same as a number of bits associated with uniquely identifying each downlink transmission of the total number of downlink transmissions. In some cases, the bit width associated with the total batch assignment index is less than a number of bits associated with uniquely identifying each downlink transmission of the total number of downlink transmissions.

In some examples, the downlink transmission component 1215 may transmit, to the first device, a second downlink transmission, where the second downlink transmission is not included in the batch of downlink transmissions that are configured to be processed together by the first device. In some examples, the assignment information component 1210 may determine second assignment information for the processing batch-based feedback for a second batch of downlink transmissions. In some examples, the assignment information component 1210 may transmit, to the first device, the second assignment information and the second batch of downlink transmissions.

The configuration component 1240 may determine that the first device is configured for a processing batch-based transmission based on determining the assignment information for the processing batch-based feedback, where transmitting the assignment information is based on the determining. In some examples, the assignment information component 1210 may configure the assignment information for the processing batch-based feedback for each device associated with the second device, or each CC associated with the first device, or a combination thereof.

The batch index component 1245 may determine a batch index associated with one or more downlink transmissions. In some examples, the downlink control information component 1225 may transmit, to the first device, a downlink control information indicating the batch index, the batch index including second assignment information for the processing batch-based feedback for a second batch of downlink transmissions, where the batch of downlink transmissions and the second batch of downlink transmissions are at least partially overlapped in time.

In some examples, the downlink transmission component 1215 may determine that the batch of downlink transmissions and a second batch of downlink transmissions are interleaved in time. In some examples, the downlink transmission component 1215 may refrain from transmitting the second batch of downlink transmissions based on the determining. In some cases, the assignment information includes an entry in a batch assignment index counter indicating that the second downlink transmission is not included in the batch of downlink transmissions.

In some cases, the batch index is included in an information field in the downlink control information. In some cases, the batch index includes an explicit batch index indicating the batch of downlink transmissions and the second batch of downlink transmissions.

Figure 13:
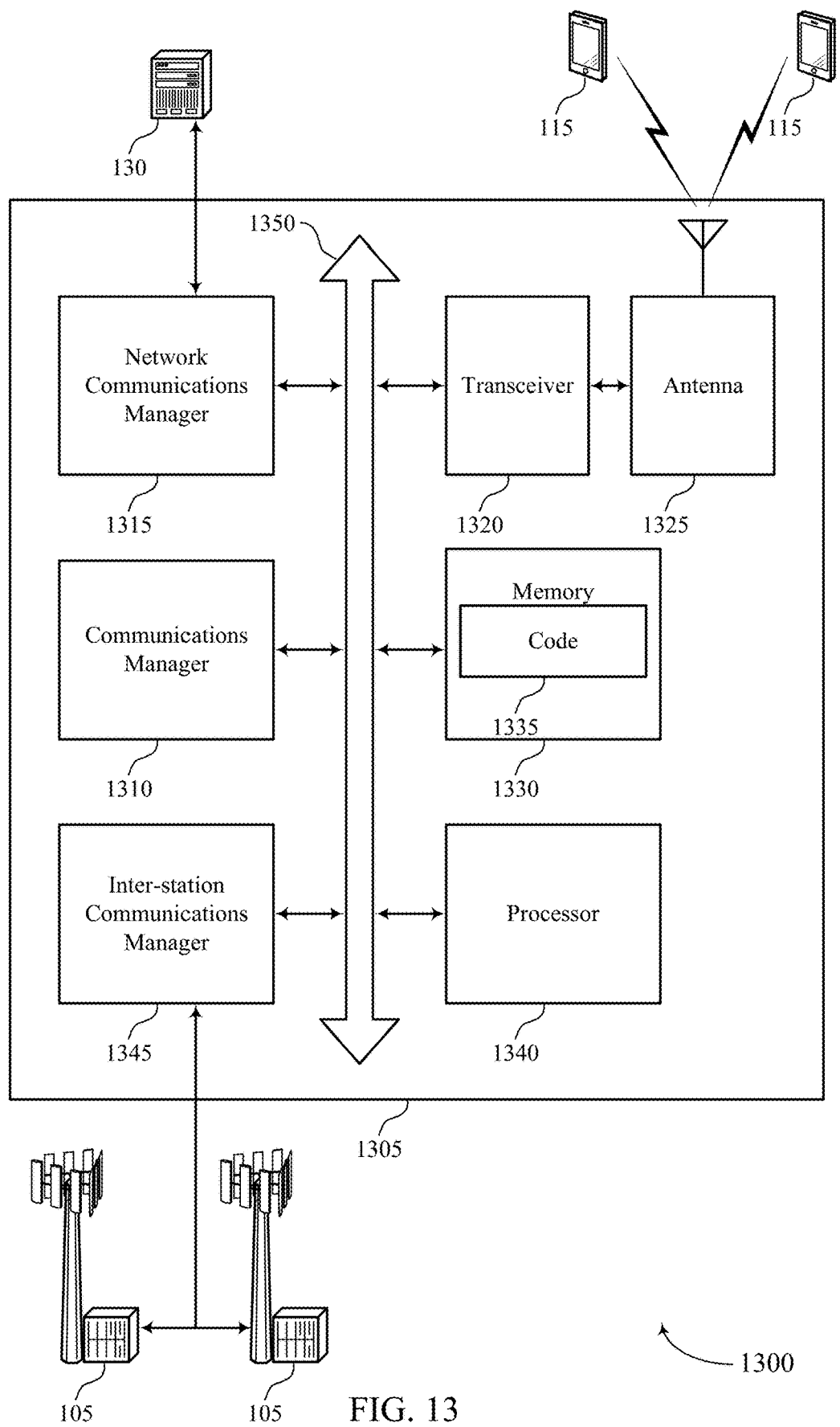
FIG. 13 shows a diagram of a system including a device that supports batch-based feedback in NR in accordance with aspects of the present disclosure.

FIG. 13 shows a diagram of a system 1300 including a device 1305 that supports batch-based feedback in NR in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine, assignment information for processing batch-based feedback for a batch of downlink transmissions that are configured to be processed together by a first device. The communications manager 1310 may transmit, to the first device, the assignment information and a downlink transmission from the batch of downlink transmissions. The communications manager 1310 may receive, from the first device, an acknowledgment feedback for the transmitted downlink transmission, where the acknowledgment feedback is based on a codebook associated with the assignment information for the processing batch-based feedback.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting batch-based feedback in NR).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
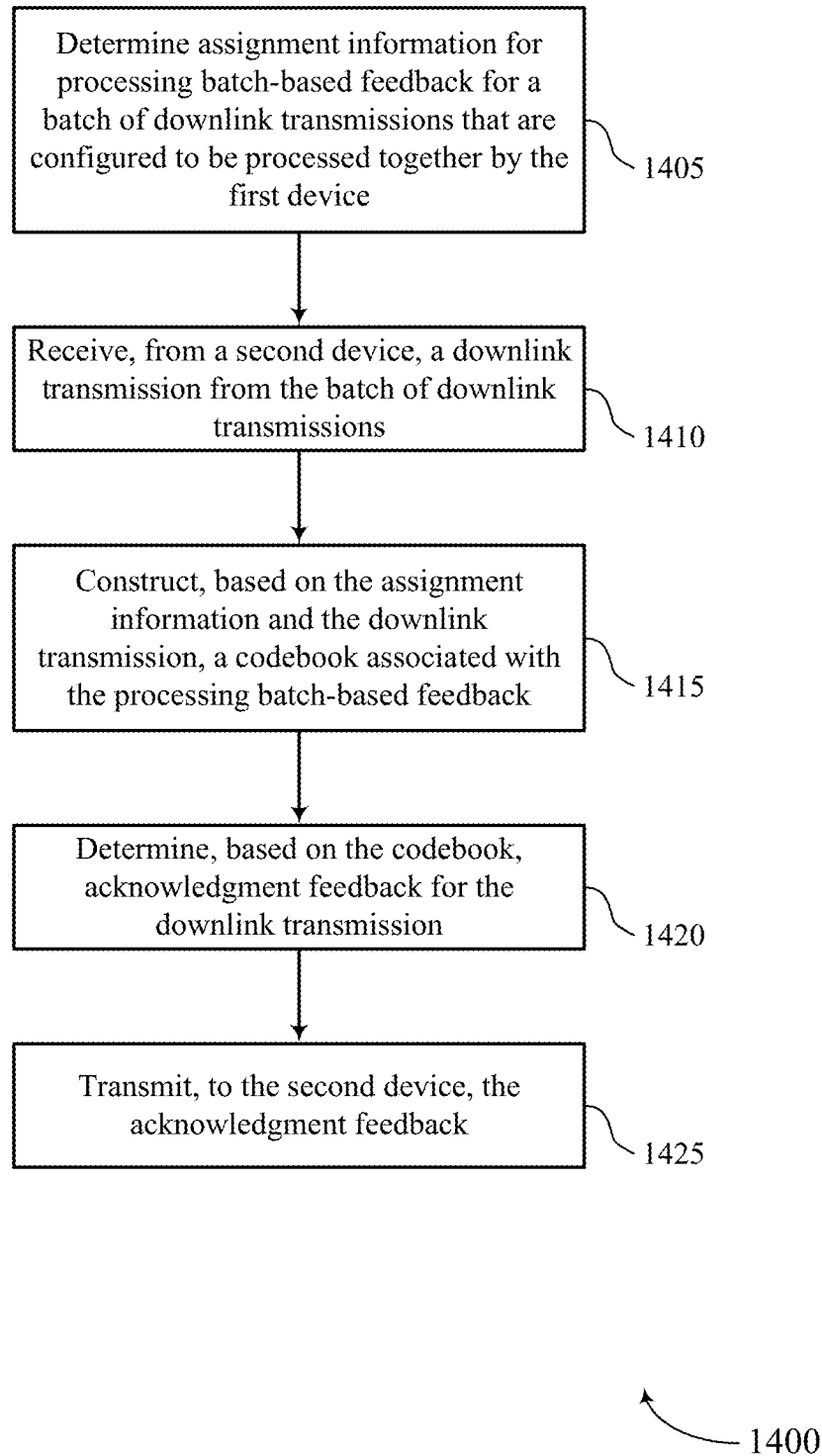
FIGS. 14 through 16 show flowcharts illustrating methods that support batch-based feedback in NR in accordance with aspects of the present disclosure.

FIG. 14 shows a flowchart illustrating a method 1400 that supports batch-based feedback in NR in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a first device (e.g., a UE 115) may execute a set of instructions to control the functional elements of the first device to perform the functions described herein. Additionally or alternatively, a first device may perform aspects of the functions described herein using special-purpose hardware.

At 1405, the first device may determine assignment information for processing batch-based feedback for a batch of downlink transmissions that are configured to be processed together by the first device. The operations of 1405 may be performed according to the methods described herein. In some examples, aspects of the operations of 1405 may be performed by an assignment information component as described with reference to FIGS. 6 through 9.

At 1410, the first device may receive, from a second device, a downlink transmission from the batch of downlink transmissions. The operations of 1410 may be performed according to the methods described herein. In some examples, aspects of the operations of 1410 may be performed by a downlink transmission component as described with reference to FIGS. 6 through 9.

At 1415, the first device may construct, based on the assignment information and the downlink transmission, a codebook associated with the processing batch-based feedback. The operations of 1415 may be performed according to the methods described herein. In some examples, aspects of the operations of 1415 may be performed by a codebook construction component as described with reference to FIGS. 6 through 9.

At 1420, the first device may determine, based on the codebook, acknowledgment feedback for the downlink transmission. The operations of 1420 may be performed according to the methods described herein. In some examples, aspects of the operations of 1420 may be performed by an acknowledgment feedback component as described with reference to FIGS. 6 through 9.

At 1425, the first device may transmit, to the second device, the acknowledgment feedback. The operations of 1425 may be performed according to the methods described herein. In some examples, aspects of the operations of 1425 may be performed by a feedback transmission component as described with reference to FIGS. 6 through 9.

Figure 15:
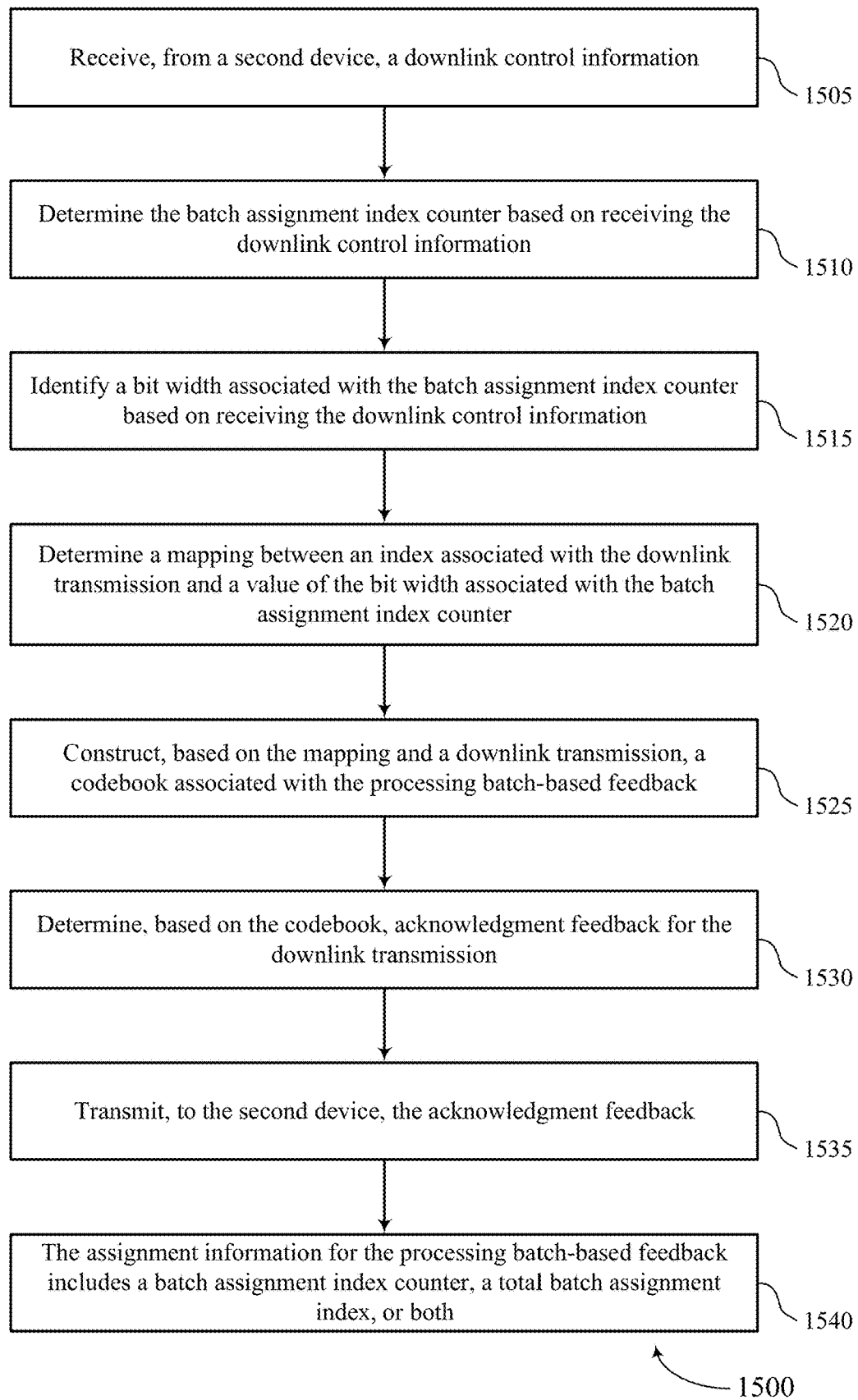

FIG. 15 shows a flowchart illustrating a method 1500 that supports batch-based feedback in NR in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a first device (e.g., a UE 115) may execute a set of instructions to control the functional elements of the first device to perform the functions described herein. Additionally or alternatively, a first device may perform aspects of the functions described herein using special-purpose hardware.

At 1505, the first device may receive, from a second device, a downlink control information. The operations of 1505 may be performed according to the methods described herein. In some examples, aspects of the operations of 1505 may be performed by a downlink control information component as described with reference to FIGS. 6 through 9.

At 1510, the first device may determine the batch assignment index counter based on receiving the downlink control information. The operations of 1510 may be performed according to the methods described herein. In some examples, aspects of the operations of 1510 may be performed by a codebook construction component as described with reference to FIGS. 6 through 9.

At 1515, the first device may identify a bit width associated with the batch assignment index counter based on receiving the downlink control information. The operations of 1515 may be performed according to the methods described herein. In some examples, aspects of the operations of 1515 may be performed by a bit width component as described with reference to FIGS. 6 through 9.

At 1520, the first device may determine a mapping between an index associated with the downlink transmission and a value of the bit width associated with the batch assignment index counter. The operations of 1520 may be performed according to the methods described herein. In some examples, aspects of the operations of 1520 may be performed by a mapping component as described with reference to FIGS. 6 through 9.

At 1525, the first device may construct, based on the mapping and the downlink transmission, a codebook associated with the processing batch-based feedback. The operations of 1525 may be performed according to the methods described herein. In some examples, aspects of the operations of 1525 may be performed by a codebook construction component as described with reference to FIGS. 6 through 9.

At 1530, the first device may determine, based on the codebook, acknowledgment feedback for the downlink transmission. The operations of 1530 may be performed according to the methods described herein. In some examples, aspects of the operations of 1530 may be performed by an acknowledgment feedback component as described with reference to FIGS. 6 through 9.

At 1535, the first device may transmit, to the second device, the acknowledgment feedback. The operations of 1535 may be performed according to the methods described herein. In some examples, aspects of the operations of 1535 may be performed by a feedback transmission component as described with reference to FIGS. 6 through 9.

At 1540, the first device may the assignment information for the processing batch-based feedback includes a batch assignment index counter, a total batch assignment index, or both. The operations of 1540 may be performed according to the methods described herein. In some examples, aspects of the operations of 1540 may be performed by an assignment information component as described with reference to FIGS. 6 through 9.

Figure 16:
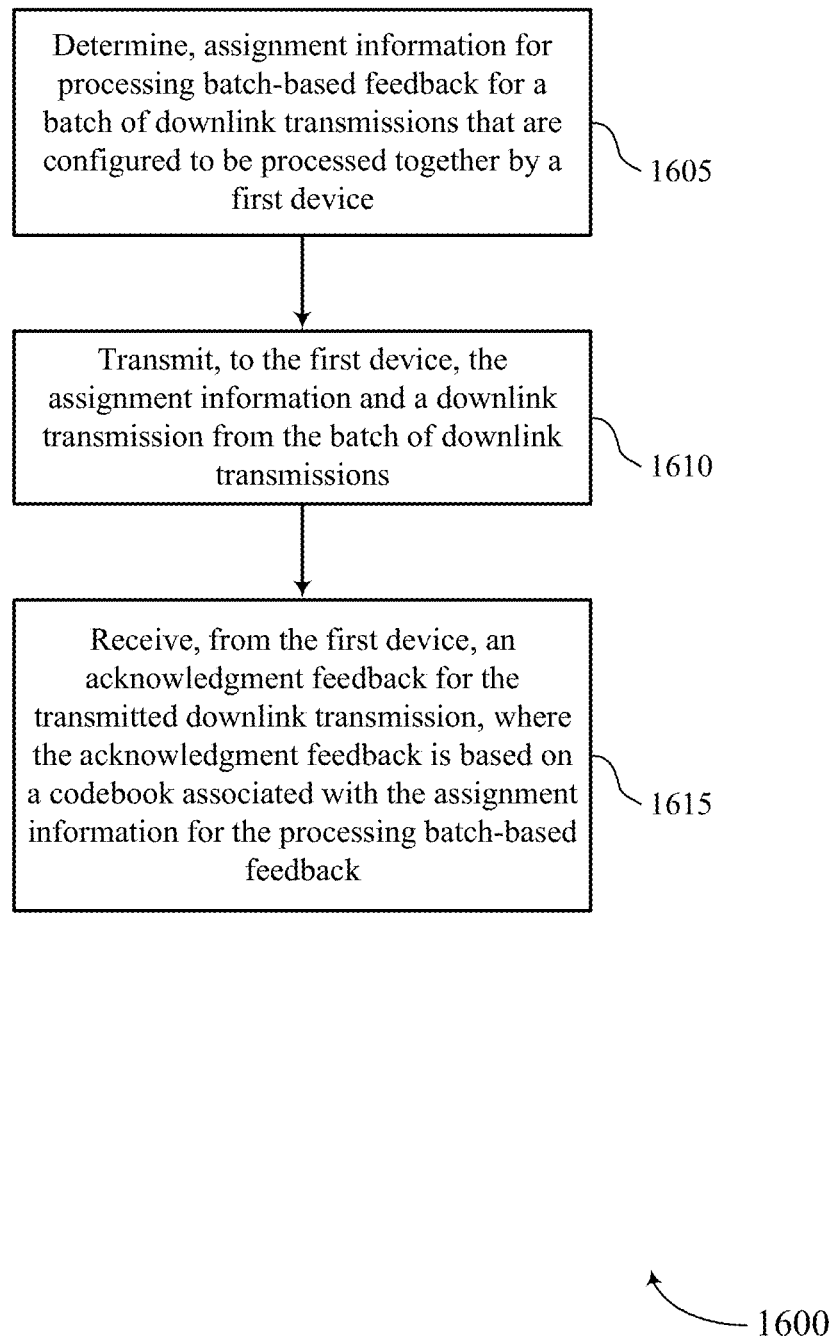

FIG. 16 shows a flowchart illustrating a method 1600 that supports batch-based feedback in NR in accordance with aspects of the present disclosure. The operations of method 1600 may be implemented by a base station 105 or its components as described herein or a UE 115 or its components as described herein. For example, the operations of method 1600 may be performed by a communications manager as described with reference to FIGS. 10 through 13. In some examples, a second device (e.g., a base station 105) may execute a set of instructions to control the functional elements of the second device to perform the functions described herein. Additionally or alternatively, a second device may perform aspects of the functions described herein using special-purpose hardware.

At 1605, the second device may determine, assignment information for processing batch-based feedback for a batch of downlink transmissions that are configured to be processed together by a first device. The operations of 1605 may be performed according to the methods described herein. In some examples, aspects of the operations of 1605 may be performed by an assignment information component as described with reference to FIGS. 10 through 13.

At 1610, the second device may transmit, to the first device, the assignment information and a downlink transmission from the batch of downlink transmissions. The operations of 1610 may be performed according to the methods described herein. In some examples, aspects of the operations of 1610 may be performed by a downlink transmission component as described with reference to FIGS. 10 through 13.

At 1615, the second device may receive, from the first device, an acknowledgment feedback for the transmitted downlink transmission, where the acknowledgment feedback is based on a codebook associated with the assignment information for the processing batch-based feedback. The operations of 1615 may be performed according to the methods described herein. In some examples, aspects of the operations of 1615 may be performed by an acknowledgment feedback component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wir0eless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   determining assignment information for processing batch-based feedback for a batch of downlink transmissions comprising a group of data packets, wherein the batch of downlink transmissions is based at least in part on a respective delivery deadline, each respective delivery deadline based at least in part on a respective delay budget associated with each data packet and a respective time of arrival associated with each data packet at the first device, and wherein the batch of downlink transmissions is to be processed together by the first device;
   receiving, from a second device, a downlink transmission from the batch of downlink transmissions;
   constructing, based at least in part on the assignment information and the downlink transmission, a codebook associated with processing the batch-based feedback;
   determining, based at least in part on the codebook, acknowledgment feedback for the downlink transmission; and
   transmitting, to the second device, the acknowledgment feedback.

2. The method of claim 1, wherein the assignment information for processing the batch-based feedback comprises a batch assignment index counter, a total batch assignment index, or both.

3. The method of claim 2, wherein determining the assignment information comprises:
   receiving, from the second device, a downlink control information; and
   determining the batch assignment index counter based at least in part on receiving the downlink control information, wherein constructing the codebook is based at least in part on determining the batch assignment index counter.

4. The method of claim 3, further comprising:
   identifying a bit width associated with the batch assignment index counter based at least in part on receiving the downlink control information; and
   determining a mapping between an index associated with the downlink transmission and a value of the bit width associated with the batch assignment index counter, wherein constructing the codebook is based at least in part on determining the mapping.

5. The method of claim 4, wherein determining the mapping further comprises:
   determining that a first index associated with a first downlink transmission and a second index associated with a second downlink transmission are mapped to a same value of the bit width, wherein constructing the codebook is based at least in part on determining the mapping.

6. The method of claim 4, wherein the bit width associated with the batch assignment index counter is based at least in part on a format associated with the downlink control information.

7. The method of claim 6, wherein the format associated with the downlink control information comprises a fallback downlink control information.

8. The method of claim 7, wherein the fallback downlink control information comprises a single bit.

9. The method of claim 6, wherein the format associated with the downlink control information comprises a non-fallback downlink control information.

10. The method of claim 9, wherein the non-fallback downlink control information comprises two bits.

11. The method of claim 2, wherein determining the assignment information further comprises:
    receiving, from the second device, a downlink control information indicating a total number of downlink transmissions included in the batch of downlink transmissions; and
    identifying the total batch assignment index based at least in part on receiving the downlink control information, wherein constructing the codebook is based at least in part on identifying the total batch assignment index.

12. The method of claim 11, further comprising:
identifying a bit width associated with the total batch assignment index based at least in part on receiving the downlink control information, wherein constructing the codebook is based at least in part on identifying the bit width associated with the total batch assignment index.

13. The method of claim 12, wherein the bit width associated with the total batch assignment index is the same as a number of bits associated with uniquely identifying each downlink transmission of the total number of downlink transmissions.

14. The method of claim 12, wherein the bit width associated with the total batch assignment index is less than a number of bits associated with uniquely identifying each downlink transmission of the total number of downlink transmissions.

15. The method of claim 1, further comprising:
receiving a second downlink transmission from the second device; and
determining, based at least in part on the assignment information, that the second downlink transmission is not included in the batch of downlink transmissions that is to be processed together by the first device, wherein constructing the codebook associated with processing the batch-based feedback is based at least in part on the determining.

16. The method of claim 15, wherein the assignment information includes an entry in a batch assignment index counter indicating that the second downlink transmission is not included in the batch of downlink transmissions.

17. The method of claim 1, further comprising:
determining second assignment information for processing the batch-based feedback for a second batch of downlink transmissions;
receiving a second downlink transmission from the second device; and
determining, based at least in part on the second assignment information, that the second downlink transmission is included in the second batch of downlink transmissions that is to be processed together by the first device, wherein constructing the codebook associated with processing the batch-based feedback is based at least in part on determining that the second downlink transmission is included in the second batch of downlink transmissions.

18. The method of claim 1, further comprising:
determining that the first device is configured for processing a batch-based transmission based at least in part on determining the assignment information for processing the batch-based feedback, wherein constructing the codebook associated with processing the batch-based feedback is based at least in part on the determining.

19. The method of claim 1, wherein the assignment information for processing the batch-based feedback is configured for each device associated with the second device, or each component carrier associated with the first device, or a combination thereof.

20. The method of claim 1, further comprising:
determining second assignment information for a non-batch-based feedback for a second batch of downlink transmissions, wherein the non-batch-based feedback comprises a code block group-based feedback, a non-group based feedback, or a combination thereof;
receiving, from the second device, a second downlink transmission from the second batch of downlink transmissions; and
constructing, based at least in part on the second assignment information, a second codebook associated with the non-batch-based feedback.

21. The method of claim 20, wherein the second assignment information for the non-batch-based feedback includes the assignment information for processing the batch-based feedback.

22. The method of claim 1, further comprising:
determining that a code block group is enabled for a first component carrier associated with the batch of downlink transmissions and the code block group is disabled for a second component carrier associated with the batch of downlink transmissions, wherein constructing the codebook associated with processing the batch-based feedback is based at least in part on determining that the code block group is enabled for the first component carrier associated with the batch of downlink transmissions and the code block group is disabled for the second component carrier associated with the batch of downlink transmissions.

23. The method of claim 1, further comprising:
receiving, from the second device, a second downlink transmission from the batch of downlink transmissions; and
determining a second acknowledgment feedback for the second downlink transmission, wherein transmitting the acknowledgment feedback further comprises transmitting the second acknowledgment feedback.

24. The method of claim 1, further comprising:
receiving, from the second device, a second downlink transmission from the batch of downlink transmissions; and
transmitting a negative acknowledgment feedback indicating a negative acknowledgment feedback for at least one downlink transmission of the batch of downlink transmissions.

25. The method of claim 1, further comprising:
receiving, from the second device, a downlink control information;
determining a batch index based at least in part on receiving the downlink control information; and
determining, based at least in part on the batch index, second assignment information for processing the batch-based feedback for a second batch of downlink transmissions, wherein the batch of downlink transmissions and the second batch of downlink transmissions are at least partially overlapped in time.

26. An apparatus for wireless communication at a first device, comprising:
a processor,
memory coupled with the processor; and
instructions stored in the memory and executable by the processor to cause the apparatus to:
determine assignment information for processing batch-based feedback for a batch of downlink transmissions comprising a group of data packets, wherein the batch of downlink transmissions is based at least in part on a respective delivery deadline, each respective delivery deadline based at least in part on a respective delay budget associated with each data packet and a respective time of arrival associated with each data packet at the first device, and wherein the batch of downlink transmissions is to be processed together by the first device;
receive, from a second device, a downlink transmission from the batch of downlink transmissions;

construct, based at least in part on the assignment information and the downlink transmission, a codebook associated with processing the batch-based feedback;

determine, based at least in part on the codebook, acknowledgment feedback for the downlink transmission; and transmit, to the second device, the acknowledgment feedback.

27. The apparatus of claim 26, wherein the assignment information for processing the batch-based feedback comprises a batch assignment index counter, a total batch assignment index, or both.

28. The apparatus of claim 27, wherein the instructions to determine the assignment information are executable by the processor to cause the apparatus to:

receive, from the second device, a downlink control information; and determine the batch assignment index counter based at least in part on receiving the downlink control information, wherein constructing the codebook is based at least in part on determining the batch assignment index counter.

29. An apparatus for wireless communication at a first device, comprising:

means for determining assignment information for processing batch-based feedback for a batch of downlink transmissions comprising a group of data packets, wherein the batch of downlink transmissions is based at least in part on a respective delivery deadline, each respective delivery deadline based at least in part on a respective delay budget associated with each data packet and a respective time of arrival associated with each data packet at the first device, and wherein the batch of downlink transmissions is to be processed together by the first device;

means for receiving, from a second device, a downlink transmission from the batch of downlink transmissions;

means for constructing, based at least in part on the assignment information and the downlink transmission, a codebook associated with processing the batch-based feedback;

means for determining, based at least in part on the codebook, acknowledgment feedback for the downlink transmission; and means for transmitting, to the second device, the acknowledgment feedback.

30. A non-transitory computer-readable medium storing code for wireless communication at a first device, the code comprising instructions executable by a processor to:

determine assignment information for processing batch-based feedback for a batch of downlink transmissions comprising a group of data packets, wherein the batch of downlink transmissions is based at least in part on a respective delivery deadline, each respective delivery deadline based at least in part on a respective delay budget associated with each data packet and a respective time of arrival associated with each data packet at the first device, and wherein the batch of downlink transmissions is to be processed together by the first device;

receive, from a second device, a downlink transmission from the batch of downlink transmissions;

construct, based at least in part on the assignment information and the downlink transmission, a codebook associated with processing the batch-based feedback;

determine, based at least in part on the codebook, acknowledgment feedback for the downlink transmission; and transmit, to the second device, the acknowledgment feedback.

* * * * *